(12) United States Patent
Stewart et al.

(10) Patent No.: US 11,803,942 B2
(45) Date of Patent: Oct. 31, 2023

(54) BLENDED GRAY IMAGE ENHANCEMENT

(71) Applicant: STMICROELECTRONICS (RESEARCH & DEVELOPMENT) LIMITED, Marlow (GB)

(72) Inventors: Brian Douglas Stewart, Edinburgh (GB); Réka Hegedüs, Edinburgh (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 143 days.

(21) Appl. No.: 17/531,419

(22) Filed: Nov. 19, 2021

(65) Prior Publication Data

US 2023/0162325 A1  May 25, 2023

(51) Int. Cl.
| | | |
|---|---|---|
| *G06T 5/00* | (2006.01) | |
| *H04N 23/71* | (2023.01) | |
| *G06T 5/50* | (2006.01) | |
| *H04N 9/64* | (2023.01) | |
| *H04N 9/77* | (2006.01) | |

(52) U.S. Cl.
CPC .......... *G06T 5/002* (2013.01); *G06T 5/50* (2013.01); *H04N 9/646* (2013.01); *H04N 9/77* (2013.01); *H04N 23/71* (2023.01); *G06T 2207/10024* (2013.01)

(58) Field of Classification Search
None
See application file for complete search history.

(56) References Cited

U.S. PATENT DOCUMENTS

| | | | |
|---|---|---|---|
| 9,189,830 B2 | 11/2015 | Wang | |
| 9,361,670 B2 | 6/2016 | Huang et al. | |
| 10,290,081 B2 | 5/2019 | Hong | |
| 10,367,976 B2 | 7/2019 | Fleizach et al. | |
| 10,609,303 B2 | 3/2020 | Hong | |

(Continued)

FOREIGN PATENT DOCUMENTS

| | | |
|---|---|---|
| CN | 106530246 A | 3/2017 |
| CN | 107862672 A | 3/2018 |
| CN | 107451977 B | 8/2020 |

OTHER PUBLICATIONS

He, Kaiming, et al., "Single Image Haze Removal Using Dark Channel Prior," IEEE Conference on Computer Vision and Pattern Recognition, Jan. 2011, 9 pages.

(Continued)

*Primary Examiner* — Quan Pham
(74) *Attorney, Agent, or Firm* — Slater Matsil, LLP

(57) ABSTRACT

A method for enhancing an image and an image enhancement device are described. The method for enhancing an image including: capturing an initial image including a plurality of pixels, and performing a pixel-by-pixel dehazing operation for each of the plurality of pixels. The performing including: generating, for each of the plurality of pixels, a value for a blended gray image based on color channels of the pixel, generating, for each of the plurality of pixels, a value for a transmission map based on the blended gray image, and generating, for each of the plurality of pixels, output color channels for a processed image based on the value for the transmission map, the processed image being an enhancement of the initial image.

18 Claims, 20 Drawing Sheets
(12 of 20 Drawing Sheet(s) Filed in Color)

(56) References Cited

U.S. PATENT DOCUMENTS

| | | | |
|---|---|---|---|
| 2011/0188775 A1* | 8/2011 | Sun | G06T 5/008 |
| | | | 382/274 |
| 2012/0212477 A1* | 8/2012 | Grindstaff | G06T 5/003 |
| | | | 345/589 |
| 2014/0177960 A1* | 6/2014 | Park | G06T 5/003 |
| | | | 382/167 |
| 2016/0026893 A1* | 1/2016 | Hoya | G06T 7/90 |
| | | | 382/165 |
| 2017/0178297 A1 | 6/2017 | Fattal | |
| 2021/0049744 A1 | 2/2021 | Huang et al. | |
| 2021/0201452 A1 | 7/2021 | Treibitz et al. | |

OTHER PUBLICATIONS

Batistell, Graciele, et al., "Color recognition sensor in standard CMOS technology," ScienceDirect, Solid-State Electronics 102, 2014, pp. 59-68.

Hsieh, Cheng-Hsiung et al., "Single Image Haze Removal with Pixel-based Transmission Map Estimation", Equations, [Online], vol. 1, Jun. 12, 2021, pp. 41-46.

Jo, Sung Yong et al., "Single Image Haze Removal Using Single Pixel Approach Based on Dark Channel Prior with Fast Filtering", Sep. 10, 2016, 18th International Conference, Austin, TX, USA, Sep. 24-27, 2015; [Lecture Notes In Computer Science; Lect.Notes Computer], Springer, Berlin, Heidelberg, pp. 151-162.

Kumar, Rahul, et al., "A Hybrid Dehazing Method and its Hardware Implementation for Image Sensors", IEEE Sensors Journal, vol. 21, No. 22, Nov. 15, 2021, 10 pages.

\* cited by examiner

Fig. 10A
| | Red (R) | Green (G) | Blue (B) |
|---|---|---|---|
| Initial Image | 0.5 | 0.4 | 0.3 |
1002
Fig. 10B
| | Red | Green | Blue |
|---|---|---|---|
| Atmospheric light | 0.8 | 0.8 | 0.9 |
1004
Fig. 10C
| | Hue | Saturation | Value |
|---|---|---|---|
| Atmospheric light | 0.5 | 0.1 | 0.9 |
1006
| | Hue | Saturation | Value |
|---|---|---|---|
| Atmospheric light | 0.5 | 0.01 | 0.9 |
1008
| | Red | Green | Blue |
|---|---|---|---|
| Atmospheric light | 0.9 | 0.9 | 0.9 |
1010

| Brightened Initial Image | Red | Green | Blue |
|---|---|---|---|
| | 0.8 | 0.7 | 0.6 |

BLENDED GRAY IMAGE ENHANCEMENT

TECHNICAL FIELD

The present invention relates generally to a system and method for image processing and, in particular embodiments, to a system and method for enhancing an image.

BACKGROUND

Images of outdoor scenes may be degraded by a turbid medium, such as particles or water droplets in the atmosphere. Light may be scattered and absorbed by these particles causing haze to be present in a captured image. Haze in a captured image is problematic because it degrades the visibility of the image. For example haze may be caused by smog, fog, drizzle, smoke or other airborne particles in images that are captured outdoors. Haze increases with distance. In other words, distant objects in hazy images will have a reduced visibility compared to closer objects in the same image.

The information (e.g. visibility) lost due to haze degrades the performance of image processing applications. Hazy images may result in image processing applications, such as object recognition, to require more processing time, complicated algorithms, the use of multiple images, and the like. Haze may also cause degradation in the performance of geo-physical image processing applications such as remote sensing applications, surveying applications, and the like. For example in automated driving applications, hazy images captured by a camera system may degrade performance in a danger critical situation and place passengers and/or bystanders in danger.

Known haze removal algorithms utilize the light scattering model to recover an original scene radiance from a hazy image. For example, haze removal algorithms may generate what is known as the dark channel prior from a captured hazy image, use the dark channel prior to generate a transmission map, and apply the transmission map to the light scattering model. The dark channel prior is based on the observation that local patches of outdoor images contain pixels that have low intensities in at least one color channel.

SUMMARY

In accordance with an embodiment of the present invention, a method for enhancing an image includes: capturing an initial image including a plurality of pixels; and performing a pixel-by-pixel dehazing operation for each of the plurality of pixels, the performing including generating, for each of the plurality of pixels, a value for a blended gray image based on color channels of the pixel, generating, for each of the plurality of pixels, a value for a transmission map based on the blended gray image, and generating, for each of the plurality of pixels, output color channels for a processed image based on the value for the transmission map, the processed image being an enhancement of the initial image.

In accordance with an embodiment of the present invention, a method for enhancing an image includes: capturing an initial image including a plurality of pixels; generating a blended gray image from the initial image; generating a brightened blended gray image from a brightened initial image; generating, for each of the plurality of pixels, a transmission map; calculating an enhancement value based on determining how much haze is present in the initial image; adjusting the transmission map based on the enhancement value; determining whether a hue of atmospheric light in the initial image is within a possible sky color range of the initial image, the possible sky color range including hue values above or below a non-sky color range; adjusting the transmission map for each of the plurality of pixels using the enhancement value; adjusting the brightened blended gray image based on determining whether the hue of atmospheric light in the initial image is within the possible sky color range; and after adjusting the transmission map, generating an enhanced image from the adjusted transmission map, the adjusted brightened blended gray image, and the initial image.

In accordance with an embodiment of the present invention an image enhancement device includes: an image sensor configured to capture an initial image; a memory configured to store the captured the initial image; and a processor in communication with the memory, the processor being configured to execute instructions stored in the memory, the memory including instructions for: capturing an initial image including a plurality of pixels; and performing a pixel-by-pixel dehazing operation for each of the plurality of pixels, the performing including generating, for each of the plurality of pixels, a value for a blended gray image from color channels of the pixel, generating, for each of the plurality of pixels, a value for a transmission map from the blended gray image, and generating, for each of the plurality of pixels, output color channels for a processed image based on the value for the transmission map, the processed image being an enhancement of the initial image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present invention, and the advantages thereof, reference is now made to the following descriptions taken in conjunction with the accompanying drawings, in which:

FIG. 2A illustrates process steps for enhancing an example color image according to an embodiment of the present application, wherein

FIGS. 10A-10D illustrates a process flow of dehazing an example pixel according to an embodiment of the present application, where FIG. 10A illustrates capturing the initial image, FIG. 10B illustrates generating the value for atmospheric light of the initial image, FIG. 10C illustrates restricting the saturation of the atmospheric light, and FIG. 10D illustrates determining the value of the example pixel for the brightened initial image.

DETAILED DESCRIPTION OF ILLUSTRATIVE EMBODIMENTS

Figure 1:
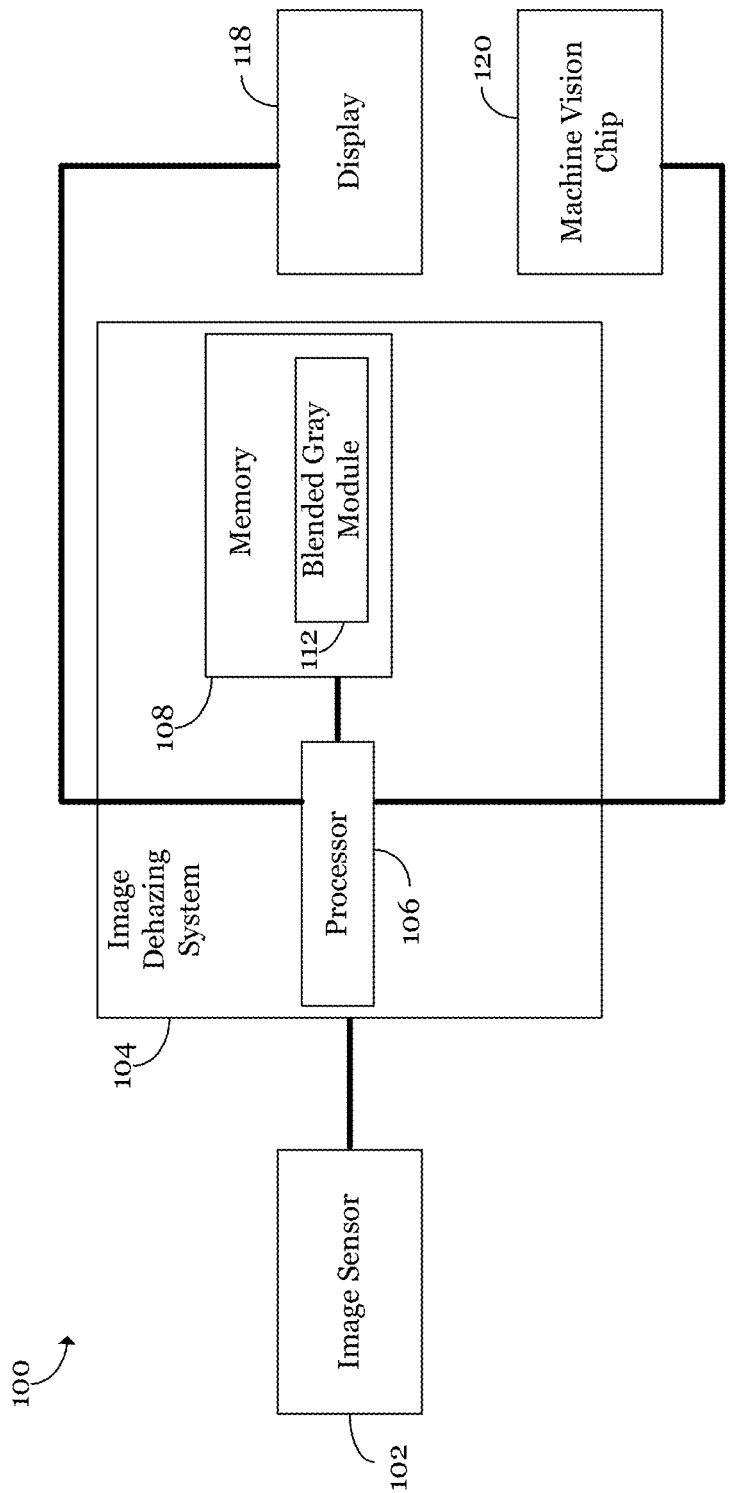
FIG. 1 is a schematic diagram of an image enhancement device according to an embodiment of the present application.

Conventional haze removal algorithms that utilize the dark channel prior come with their own set of advantages and disadvantages. For example, generating the dark channel prior requires the use of large local patches. The greater the size of the local patch, the greater the probability that the light scattering model will actually perform as expected. However, as the size of the local patches increase to ensure successful dehazing, processing times and computational costs also increase. This may result in overly high computational costs and processing times. Also algorithms that utilize the dark channel prior require their transmission maps to be further refined using an edge preserving filtering step and/or a soft matting step to protect against include false textures and blocked artifacts caused by the minimum operator used in a dark channel prior based algorithm.

A simplified version of the light scattering model is typically used to quantify the amount of haze formed in an image may be expressed as:

$$\vec{i}(\vec{x}) = \vec{i}(\vec{x})t(x) + A(1-t(x))$$ Eq. 1

Where $\vec{i}(\vec{x})$ is the intensity the pixels in the captured image, $\vec{i}(\vec{x})$ is the scene radiance of the pixels, A is the intensity of atmospheric light in the captured image, and t(x) is the intensity of pixels in the transmission map.

Typical methods for dehazing images utilize what is known as the dark channel prior combined with the simplified light scattering model to remove haze from an image. In other words methods utilizing the dark channel prior require the following steps: estimating the dark channel prior based on local patches of pixels, estimating the atmospheric light captured in the hazy image, determining a transmission map corresponding to each of the input pixels based on the dark channel prior and the estimated atmospheric light, transmission map refinement, and recovering the scene radiance. The scene may be recovered by solving Eq. 1 as follows:

$$\vec{J}(\vec{x}) = \frac{\vec{I}(\vec{x}) - A}{\max(t(x), t_0)} + A$$ Eq. 2

Where $t_o$ is typically equal to 0.1. Usually, Eq. 2 is a subtractive process, and therefore, recovered scene radiance may not be as bright as compared to the atmospheric light, which may result in too dark an image.

A first disadvantage of dark channel prior algorithms is that processing time is directly related to the size of the local patch. In other words, the smaller the local patch, the lower the processing time. However, images that have low-frequency textures may require a larger local patch size. In other words, features that dominate a patch size with little to no variation may not meet the requirements of dark channel prior algorithms. Therefore, a larger patch size may need to be considered to ensure there is enough variation within the local patch. Thus, an image with low-frequency textures may require a larger local patch resulting in higher computational costs and overly long processing times.

Another disadvantage of dark channel prior algorithms is that the estimation of atmospheric light is determined as follows: a small fraction of the brightest pixels of the dark channel prior are identified, and then a pixel within the small fraction of pixels is selected from the hazy image.

However, this may be problematic because the selected pixel may not correspond to the atmospheric light. For example in an image of a road, the brightest pixels may correspond to a white car or a reflective sign, not the atmospheric light.

Another disadvantage of the dark channel prior algorithms is that the minimum operator used may cause a blocky dehazed image. In other words, the dehazed image may include and blocked artifacts which may causes error in post-processing or decision making based on the dehazed image.

Another disadvantage of dark channel prior algorithms is that it requires the transmission map to be refined. Transmission map refinement may include a soft-matting step. The additional step of refining the transmission map may also significantly increase the computational cost and processing time required to dehaze an image.

Embodiments of this application disclose pixel based methods and corresponding devices for enhancing images that does not require the additional soft matting step. More specifically, embodiments of the present invention relate to a method for enhancing an image utilizing single pixel operations that enhances images with an improved contrast/visibility and a reduced processing time while avoiding blocking of artifacts that is inherent in regional filtering techniques.

FIG. 1 is a schematic diagram of an image dehazing device according to an embodiment of the present application.

Referring to FIG. 1, an image dehazing device 100 may comprise an image sensor 102, such as a camera, an image dehazing system 104, a display 118 and a machine vision chip 120.

The image dehazing system 104 may comprise a processor 106 coupled to a memory 108.

The memory 108 may be a stationary memory and/or a random access memory (RAM), a read only memory (ROM), a flash memory, a hard drive, and the like. The memory 108 may be configured to store a blended gray module 112 executable to dehaze an image.

The processor 106 may be configured to access and execute the blended gray module 112 stored in the memory 108 to dehaze an image and display it on the display 118. The processor 106, may comprise, for example, a central processing unit (CPU), a microprocessor, a digital signal processor (DSP), an application specific integrated circuit (ASIC), or the like.

In various embodiments, the processor 106 may also be configured to transmit the dehazed image to the machine vision chip 120 for further processing related to applications such as object recognition, remote sensing applications, surveying applications, and the like. Alternatively, in certain embodiments, the processor 106 may be integrated with the machine vision chip 120.

In various embodiments, the processor 106 and the memory 108, and the image sensor 102 may be integrated together, for example, in an application specific integrated circuit (ASIC) of a camera or another imaging device. In alternative embodiments, the image dehazing device 100 may be connected to or built-in to an electronic device such as a personal computer, a laptop, a smart phone, a tablet, and the like.

Figure 2A:
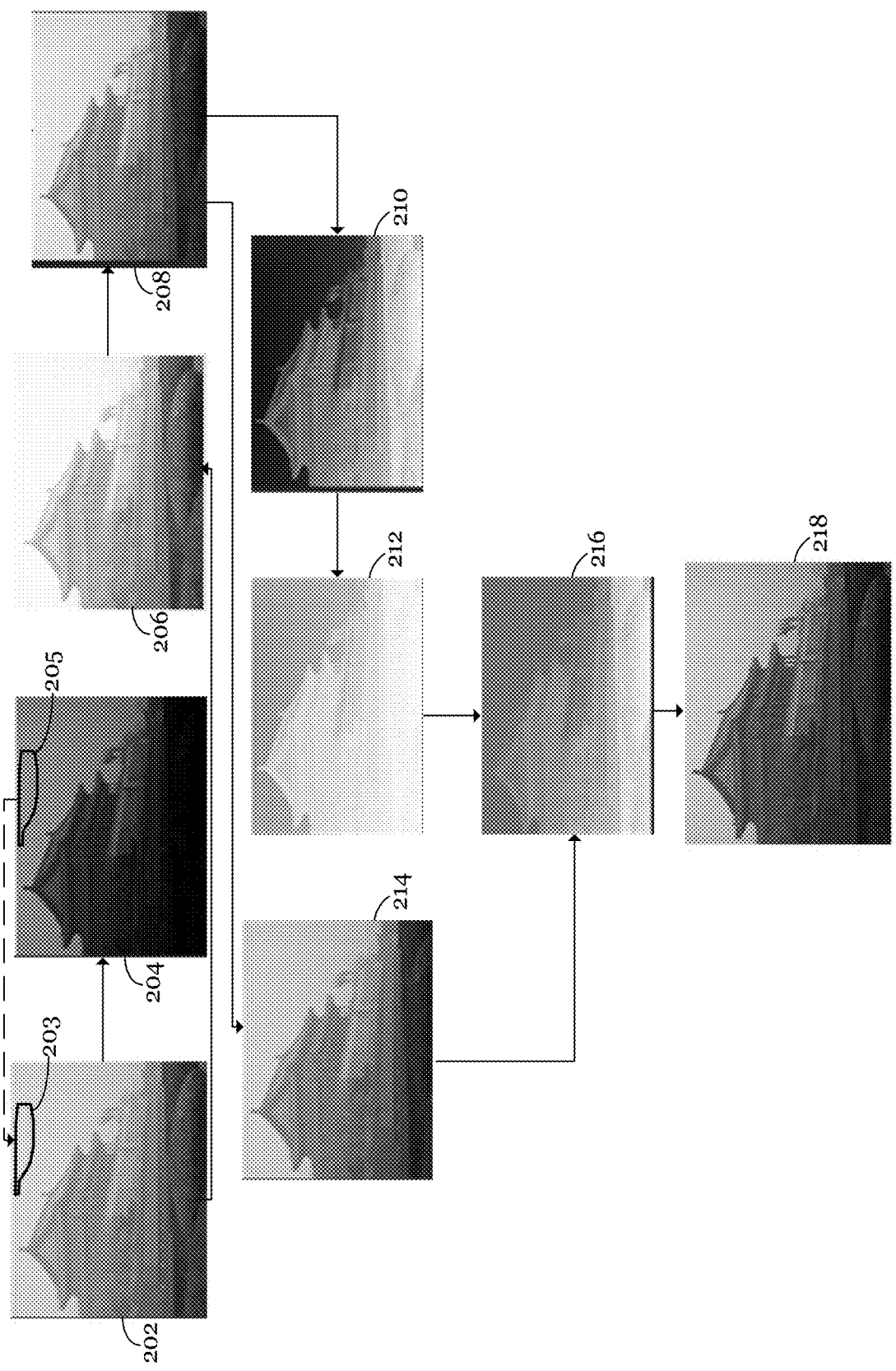
Figure 2B:
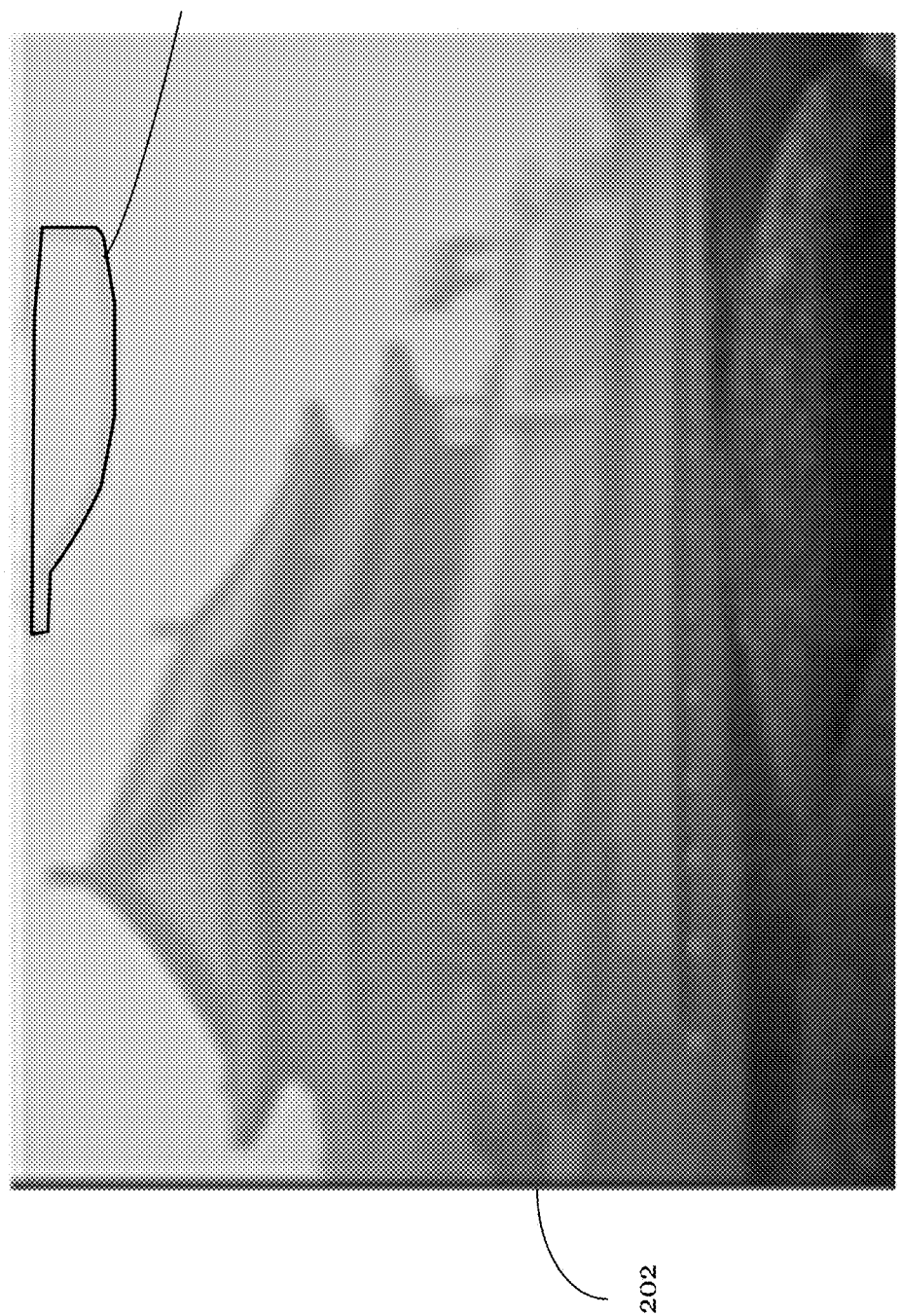
FIG. 2B illustrates a magnified higher resolution schematic of the initial image.
Figure 2C:
FIG. 2C illustrates a magnified higher resolution schematic of the blended gray image.
Figure 2D:
FIG. 2D illustrates a magnified higher resolution schematic of the brightened initial image.
Figure 2E:
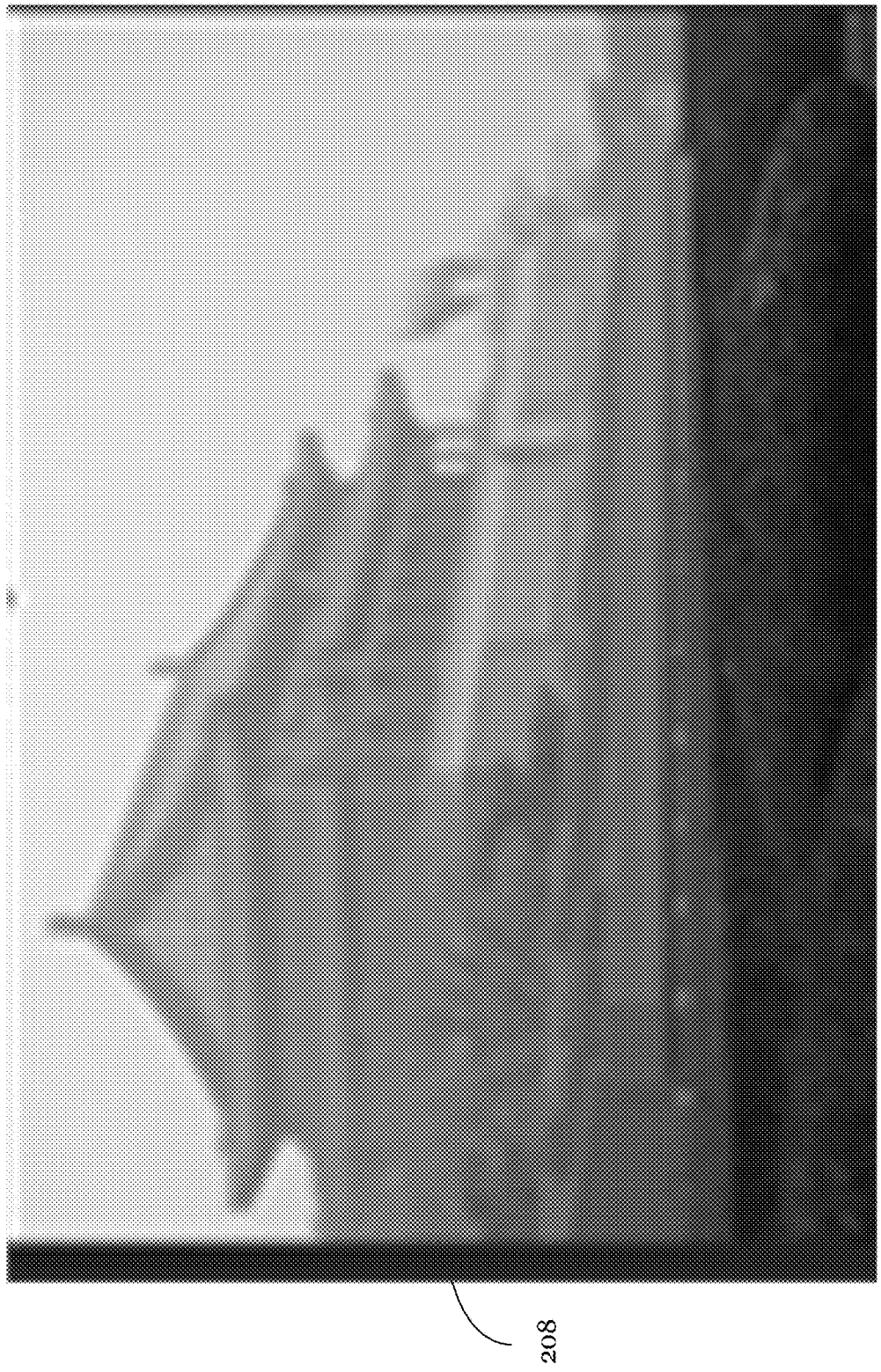
FIG. 2E illustrates a magnified higher resolution schematic of the brightened blended gray image.
Figure 2F:
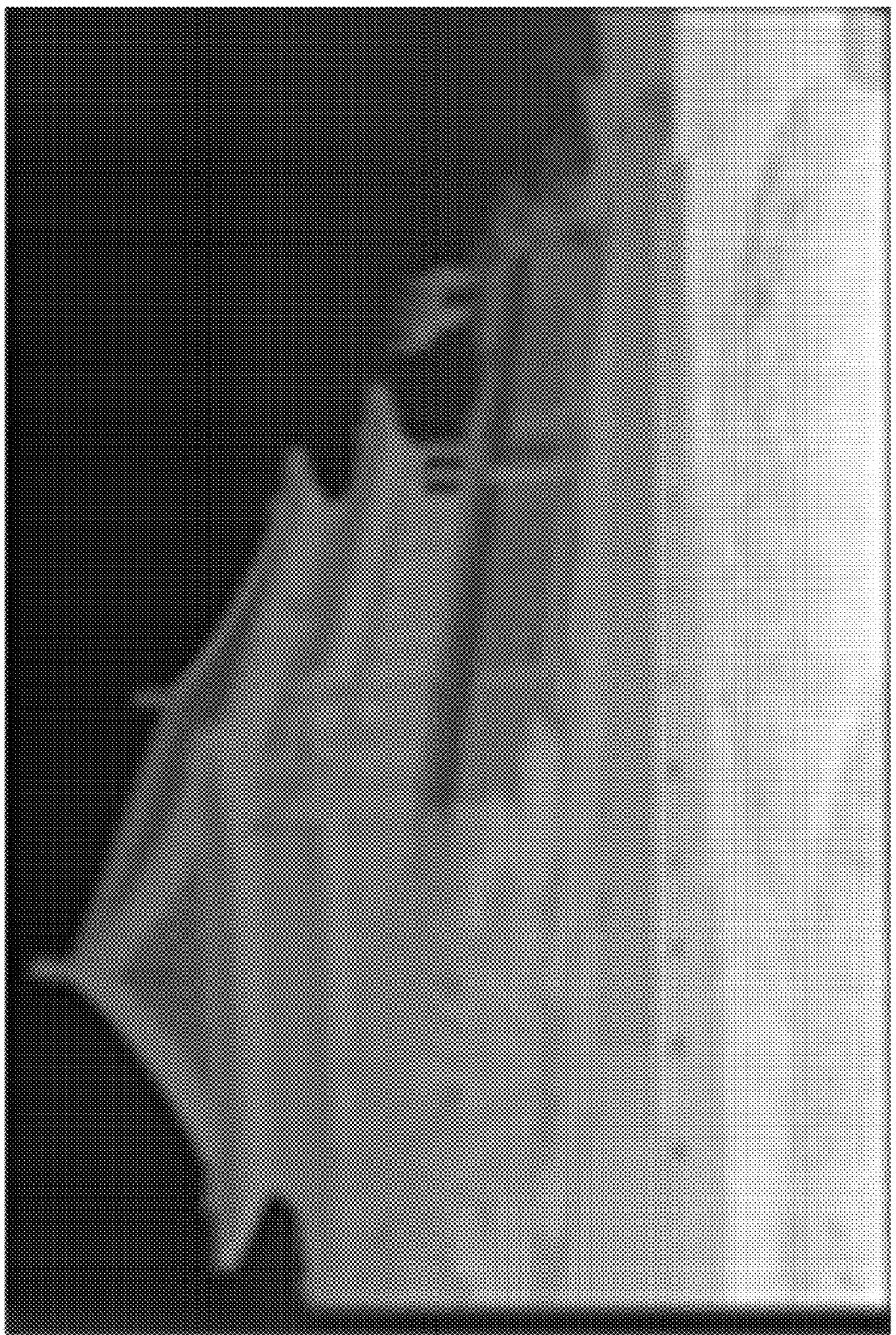
FIG. 2F illustrates a magnified higher resolution schematic of the transmission map.
Figure 2G:
FIG. 2G illustrates a magnified higher resolution schematic of the brightened transmission map.
Figure 2H:
FIG. 2H illustrates a magnified higher resolution schematic of the adjusted brightened blended gray image.
Figure 2I:
FIG. 2I illustrates a magnified higher resolution schematic of the mid-scene transmission map.
Figure 2J:
FIG. 2J illustrates a magnified higher resolution schematic of the enhanced image.

FIG. 2A illustrates process steps for a pixel-by-pixel method for enhancing an example image according to an embodiment of the present application. FIG. 2B illustrates a magnified higher resolution schematic of the initial image 202, FIG. 2C illustrates a magnified higher resolution schematic of the blended gray image 204, FIG. 2D illustrates a magnified higher resolution schematic of the brightened initial image 206, FIG. 2E illustrates a magnified higher resolution schematic of the brightened blended gray image 208, FIG. 2F illustrates a magnified higher resolution schematic of the transmission map 210, FIG. 2G illustrates a magnified higher resolution schematic of the brightened transmission map 212, FIG. 2H illustrates a magnified higher resolution schematic of the adjusted brightened blended gray image 214, FIG. 2I illustrates a magnified higher resolution schematic of the mid-scene transmission map 216, FIG. 2J illustrates a magnified higher resolution schematic of the enhanced image 218.

Figure 3:
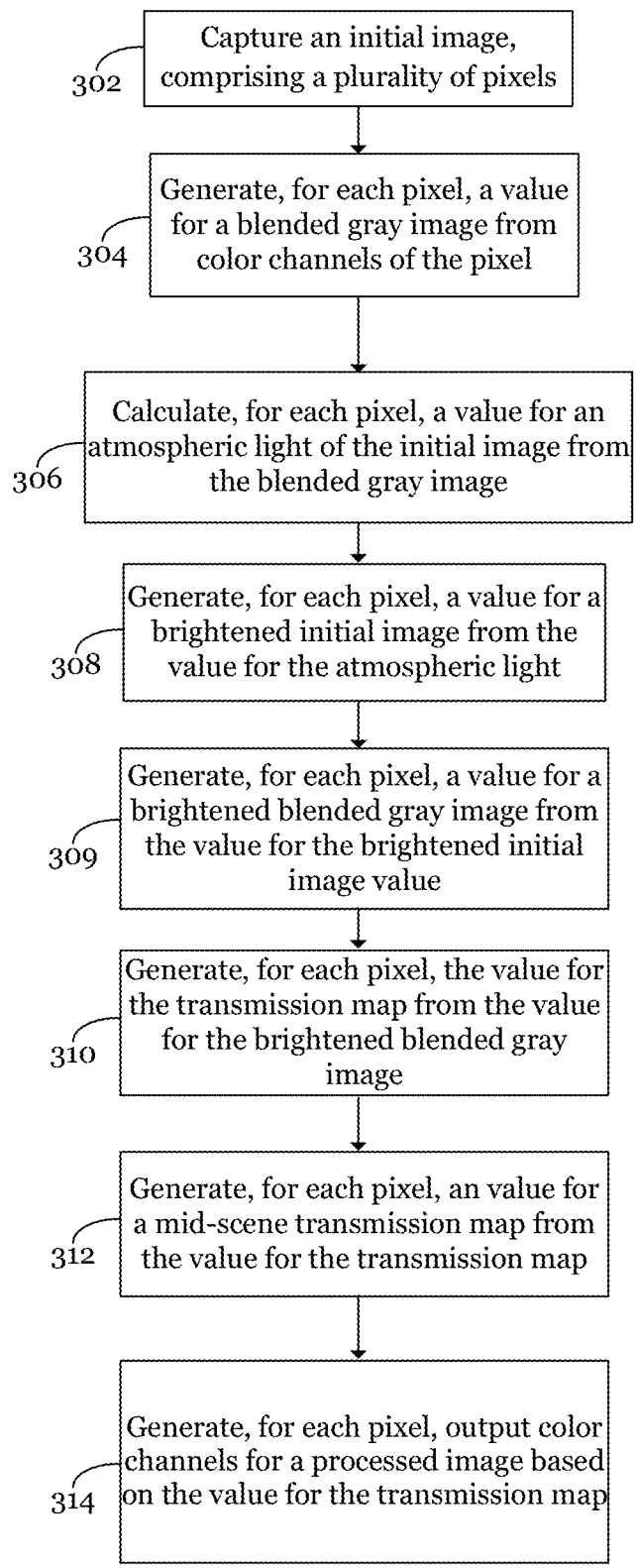
FIG. 3 illustrates a process flow for enhancing an image according to an embodiment of the present application.

FIG. 3 illustrates a process flow corresponding to FIG. 2A for a pixel-by-pixel method for enhancing an image according to an embodiment of the present application.

Advantageously, the pixel-by-pixel method generates a blended gray image by blending the color channels of each pixel of a hazy image. In other words, the pixel-by-pixel method generates a blended gray image that broadly matches the dark channel prior without the use of the minimum operator required by the dark channel prior. This will be shown in more detail below.

In various embodiments the pixel-by-pixel method may be applied to applications in which processing occurs after the full hazy image is determined or may be applied to video processing applications, where, for example, the image dehazing device 100 (e.g. processing) is embedded in an ASIC of an electronic device. In other words, in video applications where pixels are processed as they are read from the image sensor 102, values or statistics collected from a previous frame may be applied to a current frame being processed. In other words as understood by those with ordinary skill in the art, framestores may or may not be used in conjunction with the pixel-by-pixel method.

Referring to FIG. 2A, the image receiving module 110 may comprise instructions to receive an initial image 202 captured by the image sensor 102 and determine a plurality of pixels that make up the image (block 302). In various embodiments, as described above, the scene captured in the initial image 202 may include haze, which causes reduced visibility. Although the embodiments described below describe removal of haze, i.e., dehazing, these are also applicable to other atmospheric effects that cause reduced visibility. For example, the embodiments may be also applied to images with smoke, fog, snow, rain, mist, and others due to the used of the simplified light scattering model. In other embodiments, the initial image 202 may not include haze and the foregoing method may also be used in lieu of conventional contrast enhancement techniques such as local tone mapping.

In various embodiments, the initial image 202 may be a color image. In various embodiments, each of the plurality of pixels in the initial image 202 may comprise a vector comprising an intensity for each of the color channels present in each pixel. For example each of the plurality of pixels of the initial image 202 may comprise red-green-blue (RGB) color channels, a YUV color channels, cyan-magenta-yellow-key (CMYK) color channels, or the like. For example purposes, an initial image 202 with RGB color channels will be discussed. The color channels present in the pixels of the initial image 202 are not limited by this application.

Accordingly, in various embodiments, the image receiving module no may comprise instructions that when executed by the processor 106 determine the value of the color channels at each pixel within the image.

The inventors of this application have identified that dark channel prior algorithms may result in a dehazed image with blocked artifacts. Dark channel prior algorithms may require the use of localized patches to determine the dark channel, and require a transmission map refinement step, which both increase processing time. On the other hand, as described above, if smaller local patches are used in a dark channel prior algorithm to save processing time, low-frequency textures may dominate the local patch. Therefore the dark channel prior assumption may not hold, and the hazy image may not be successfully dehazed.

Additionally, as described above, the atmospheric light estimated in dark channel prior algorithms corresponds to a pixel in the hazy image selected from a small fraction of pixels, and therefore, dark channel prior algorithms are not able to distinguish between sky areas and bright objects in the image.

Therefore, the blended gray module 112 may include instructions that when executed in the processor 106 cause the processor 106 to generate, for each of the plurality of pixels, a value for a blended gray image 204 from the color channel of each of the pixels in the initial image 202 (block 304). In other words, a blended gray image 204 may be generated by blending the color channels of each individual pixel in the initial image 202 together. Depending on the processing capability of the processor 106, this blending of the color channels at each pixel may be performed sequentially or in parallel with other pixels in the image. The color channels of each pixel in the initial image 202 may be blended by multiplying each individual pixel's color channels, resulting in a blended gray image 204. For example the red channel, the green channel, and the blue channel of each pixel in the initial image 202 may blended by multiplying them together. Therefore each of the plurality of pixels in the blended gray image 204 may comprise a single value.

Advantageously, each of the plurality pixels in the initial image 202 will be darkened by the blending of the color channels, and pixels that have lower intensities in at least one color channel in the initial image 202 may be darkened more than pixels with closer to even intensities. One advantage of this is that the blended gray image 204 may have the same effect as generating the dark channel prior, but may be generated using a single pixel operation instead of local patches.

After generating the blended gray image 204, the blended gray module 112 may include instructions that when executed in the processor 106 cause the processor 106 to calculate, for each of the plurality of pixels, a value for an atmospheric light of the initial image 202 from the blended gray image 204 (block 306). The value of the atmospheric light may be calculated based on a small fraction of the brightest pixels (e.g. values) in the blended gray image 205, the intensity of the color channels of the pixels in the initial image that correspond to the brightest pixels in the blended gray image 203, and the quantity of pixels in the brightest pixels in the blended gray image 205. This will be discussed in further detail in the flow chart in FIG. 5 below.

The inventors of this application identified that for each of the plurality of pixels, because the blended gray image 204 is generated by multiplying the color channels of each pixel of the initial image 202, the initial image 202 may be over darkened when generating the blended gray image 204. In other words, each pixel of the blended gray image 204 may be two to three times darker than the value of the darkest color channel of each corresponding pixel in the initial image 202. Therefore, the blended gray module 112 may include further instructions that when executed in the processor 106 cause the processor 106 to generate, for each of the plurality of pixels, a value for a brightened initial image 206 from the value for the atmospheric light (block 308) that may be used to generate a blended gray image that broadly matches the dark channel prior in a subsequent step.

In other words, for each of the plurality of pixels, the values for the brightened initial image 206 may be generated based on the value of atmospheric light (block 308) using:

$$\overrightarrow{I_{brigthened\ image}}(\vec{x}) = \left(\frac{\vec{I}(\vec{x})}{A}\right)^{BR} \quad \text{Eq. 3}$$

Where $\overrightarrow{I_{brigthened\ image}}(\vec{x})$ represents the value of each pixel in the brightened initial image 206, $\vec{I}(\vec{x})$ represents the value of each pixel in the initial image 202, A represents the value of the atmospheric light, and BR represents a global brightening constant.

Advantageously, the global brightening constant (BR) may be used to brighten each color channel of each pixel of the initial image 202 while keeping them less than or equal to one when generating the brightened initial image 206. One advantage of this, as described below, is that the brightened initial image 206 may be used to generate a blended gray image that broadly matches the dark channel prior using single pixel operations.

Therefore, the global brightening constant may be any value that increases the brightness of each pixel of the initial image and allows for a blended gray image to be generated from the brightened initial image 206 that broadly matches the dark channel prior. The global brightening constant may be a value between 0.3 and 0.6, alternatively, the global brightening constant may be a value between 0.4 and 0.5. The inventors of this application determined, after observing an entire data set of images dehazed using the pixel-by-pixel method that 0.45 may be the optimal value of the global brightening constant. However, with further investigation a different number within the range may be used.

Referring back to FIG. 2A, to generate a blended gray image that meets the minimum brightness requirement, the blended gray module 112 may include further instructions that when executed in the processor 106 cause the processor 106 to generate, for each of the plurality of pixels, a value for a brightened blended gray image 208 from the value for the brightened initial image 206 (block 309). In other words, the color channels of each pixel in the brightened initial image 206 may be blended by multiplying the color channels of each of the individual pixels in the brightened initial image 206 by one another in the same manner discussed above. Therefore, each of the plurality of pixels in the brightened blended gray image 208 may comprise a single value.

Next, the blended gray module 112 may include instructions that when executed in the processor 106 cause the processor 106 to generate, for each of the plurality of pixels, a value for a transmission map 210 from the values for the brightened blended gray image 208 (block 310). In other words, the transmission map 210 may be generated by inverting the value of each of the pixels in the brightened blended gray image 208.

$$\vec{t}(x) = 1 - I_{brigthened\ blended\ gray}(x) \quad \text{Eq. 4}$$

After generating the transmission map 210, the blended gray module 112 may include further instructions that when executed in the processor 106 cause the processor 106 to generate, for each of the plurality of pixels, a value for an mid-scene transmission map 216 from the value for the transmission map 210 (block 312).

As understood by those with ordinary skill in the art, far objects usually correspond to sky area areas or other areas of the initial image 202 where only noise (and no useful information) will be recovered from dehazing them. Also, as understood by those with ordinary skill in the art, close objects in the initial image 202 are less effected by haze and should not undergo as much dehazing as mid-scene objects that are more effected by haze.

Therefore, in various embodiments, the mid-scene transmission map 216 may be generated and structured to focus dehazing to the mid-scene of the initial image 202 by: for each of the plurality of pixels, generating a value for a brightened transmission map 212 from the value of the transmission map 210, generating a value for an adjusted brightened blended gray image 214 from the brightened blended gray image 208 based on the hue of the calculated atmospheric light, combining the value of the brightened transmission map 212 and the value of the adjusted brightened blended gray image 214, and inverting the combined value of the brightened transmission map 212 and the adjusted brightened blended image 214. This will be discussed in more detail in FIG. 6 below.

Next, the blended gray module 112 may include instructions that when executed in the processor 106 cause the processor 106 to generate, at each pixel, output color channels for a processed image based on the value for the transmission map, the processed image being an enhancement of the initial image (block 314). In one or more embodiments, the blended gray module 112 may include instructions for recovering, for each of the plurality of pixels, a scene radiance value of the initial image 202 based on each of the pixel values in the mid-scene transmission map 216, the initial image 202, and the atmospheric light. In various embodiments, the scene radiance of the initial image 202 may be recovered a simplified version of the light scattering model:

$$\vec{J}(\vec{x}) = \frac{\vec{I}(\vec{x}) - A}{T(x)} + A \quad \text{Eq. 5}$$

Where T(x) represents the value of the mid-scene transmission map 216 for each of the plurality of pixels.

Advantageously, because the values of the mid-scene transmission map 216 are generated based on single pixel operations and the hue of the atmospheric light, an additional transmission map refinement step (e.g. soft-matting) to smooth the mid-scene transmission map 216 is not required. One advantage of this is that it reduces the computational cost and processing time to dehaze an image.

The inventors of this application have observed that a filter of different sizes, such as a Gaussian filter, may optionally be used when the values of the mid-scene transmission map 216 are divided when recovering the scene radiance for an even sharper enhanced image 218. For example, in various embodiments, a small sized filter, such as a 5×5 Gaussian filter, may be used when recovering the scene radiance. In other embodiments, a 5×5 Gaussian filter may be used on the brightened blended gray image 208 prior to generating the adjusted brightened blended gray image 214. Advantageously, as understood by those with ordinary skill in the art, the filter may be computationally cheap to implement and have a minimal effect on the overall processing time.

As described above, an advantage of the pixel-by-pixel method is that, the simplified version of the light scattering model (Eq. 5) used along with the steps described above ensures that pixels that require more dehazing will in fact undergo more dehazing than pixels that do not require as much dehazing.

Figure 4:
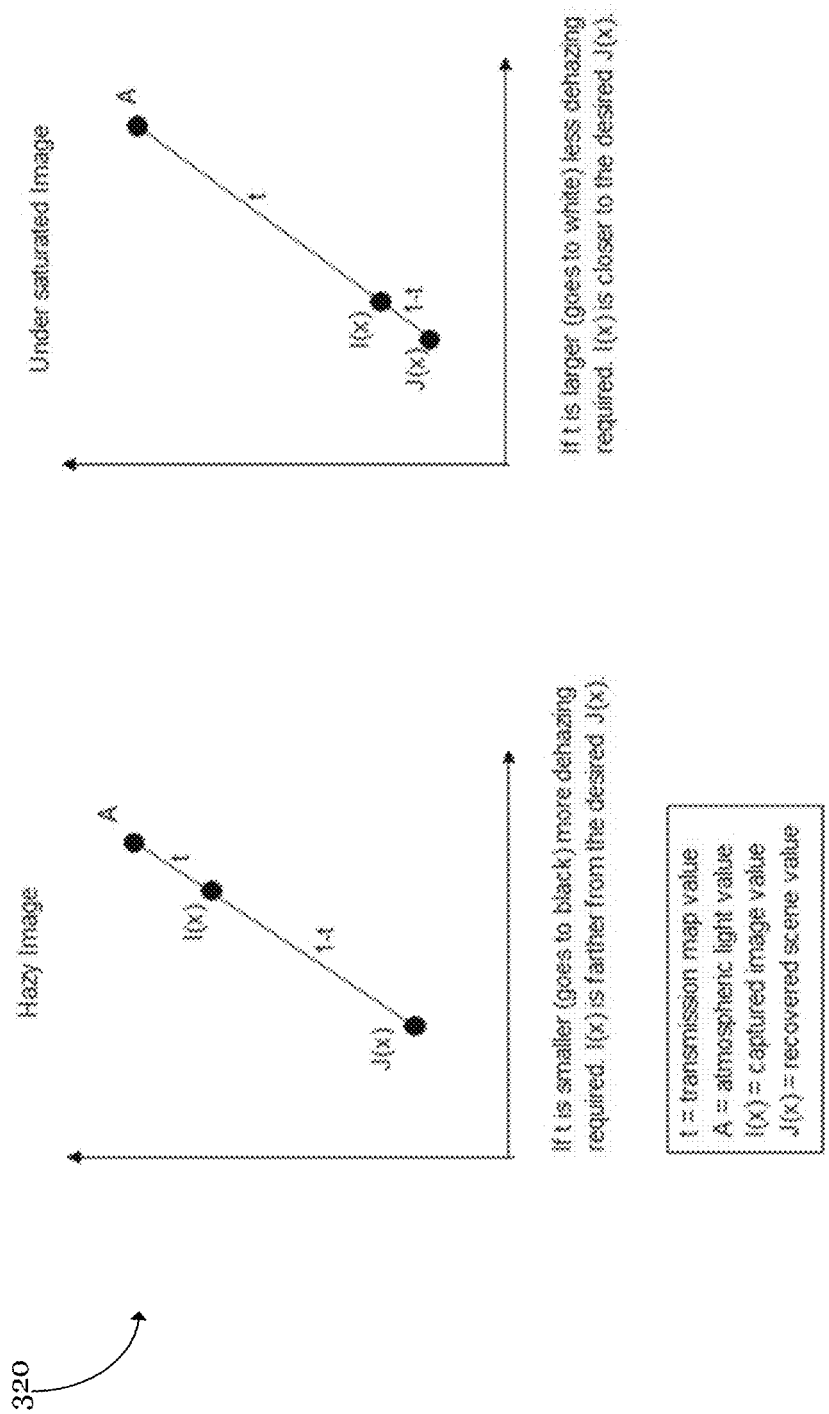
FIG. 4 illustrates a graphical representation of how the pixel-by-pixel dehazing method and the simplified light scattering model a hazy image undergoes more dehazing than an under saturated image.

FIG. 4 illustrates a graphical representation of how the pixel-by-pixel dehazing method and the simplified light scattering model ensures a hazy image undergoes more dehazing then an unsaturated image.

As illustrated by the side-by-side graphs 320 in FIG. 4, the difference between the recovered scene radiance and the intensity the pixels in the initial image 202 may be greater in a hazy initial image than an under saturated initial image.

In various embodiments, as illustrated by FIG. 4, the smaller the transmission value a pixel in a transmission map 210 (e.g. t(x)) the closer the value of the pixel in the initial image 202 is to the atmospheric light. Also, the smaller the transmission value of a pixel in the transmission map 210, the farther it is away from its desired recovered scene radiance (J(x)).

Therefore, as understood by those with ordinary skill in the art, pixel values of an under saturated initial image 202 (e.g. 1−t(x)) may be closer to the value of the atmospheric light than pixels in a hazy initial image. In other words, pixels in a hazy initial image 202 are further away from a desired J(x) value than an under saturated initial image 202, and require additional dehazing.

In other words, blended color channels of an under saturated pixel will have lower transmission values than hazy pixels.

Because the values of the mid-scene transmission map 216 are determined based on, at least in part, a transmission map 210 that is generated by inverting blended pixels, darker blended pixels (e.g. non-zero pixels with values less than 0.5) will be brightened in the transmission map 210 (and vice versa). Therefore, based on the simplified version of the scattering of light model (e.g. Eq. 5) the higher the value of a non-zero pixel in the transmission map 210 (e.g. the closer they are to one), the less those pixels will be dehazed (and vice versa). Thus, as illustrated in FIG. 4, the simplified version of the scattering light model (e.g. Eq. 5), ensures that a hazy image, which requires more dehazing, will be dehazed more than an under saturated image.

Figure 5:
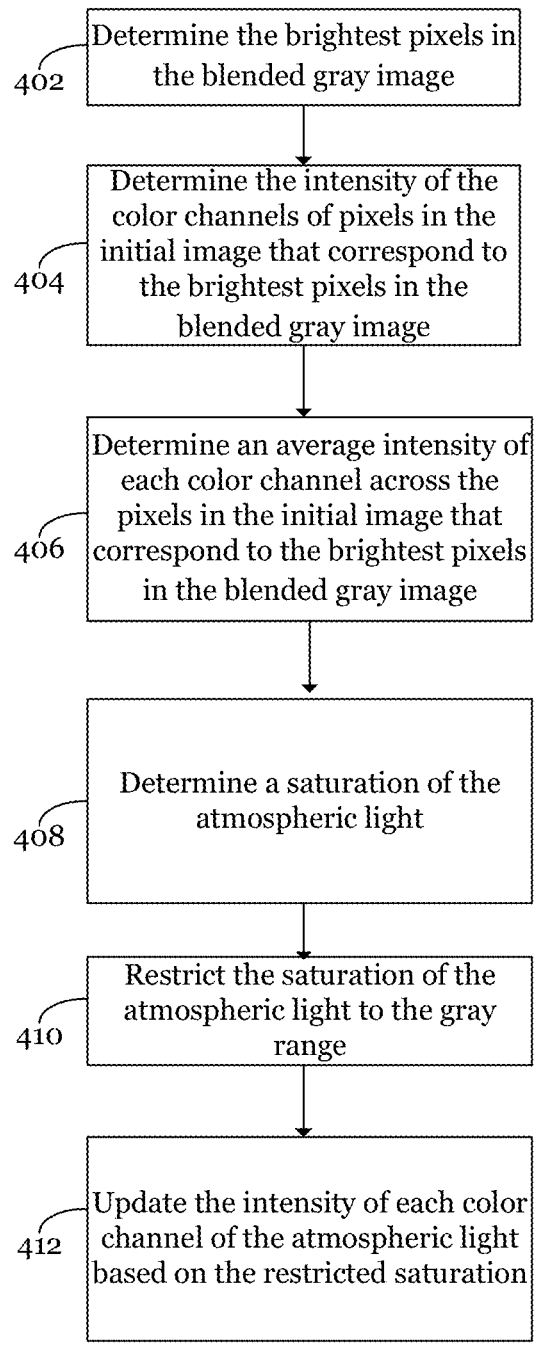
FIG. 5 illustrates a process flow for calculating atmospheric light of an image according to an embodiment of the present application.

FIG. 5 illustrates a process flow for calculating, for each of the plurality of pixels, a value for an atmospheric light of the initial image 202 from the blended gray image 204. FIG. 5 may correspond to block 306 of FIG. 3.

As illustrated in block 402, and described with reference to FIG. 2A, for each of the plurality of pixels in the blended gray image 204, the brightest pixels in the blended gray image 205 may be determined. In various embodiments, the brightest pixels in the blended gray image 205 may comprise a small fraction of the brightest pixels in the blended gray image 204 (e.g. the pixels with the highest intensities). In various embodiments, the brightest pixels in the blended gray image 205 may be the pixels with values within the top 0.1% to 1% of values in the blended gray image 204, or alternatively 1% to 3% in another example.

In various embodiments, as described above and understood by those with ordinary skill in the art, in video processing applications pixel processing may occur as pixels are read from the image sensor 102 (e.g. frame stores are not required). Therefore, in video processing applications, to address a need for a full frame to determine the brightest pixels in the blended gray image 205, the brightest pixels in the blended gray image 205 of a previous frame (f−1) can de accumulated and applied to a current frame (f). Advantageously, this avoids the need to require framestores having to determine the full image before a value can be determined for a given pixel.

As next illustrated in block 404, and described with reference to FIG. 2A, for each of the brightest pixels in the blended gray image 205, the value of pixels in the initial image that correspond to the small fraction of the brightest pixels in the blended gray image 203 may be determined. As understood by those with ordinary skill in the art, each value of the pixels in the initial image that correspond to the brightest pixels in the blended gray image 203 may be vectors that comprise an intensity corresponding to each color channel. For example the value of pixels in the initial image that correspond to the brightest pixels in the blended gray image 203 may comprise an intensity corresponding to a red channel, green channel, and blue channel.

As next illustrated in block 406, and described with reference to FIG. 2A, the average value of each of the pixels the initial image that correspond to the brightest pixels in the blended gray image 203 may be determined. In various embodiments, calculating the average value across the pixels in the initial image that correspond to the brightest pixels in the blended gray image 203 may include separately calculating the sum of the intensity of each color channel across each of the pixels in the initial image that correspond to the brightest pixels in the blended gray image 203 and dividing by the quantity of brightest pixels in the blended gray image 205.

For example, the sum of the intensity of the red channel in each of the pixels in the initial image that correspond to the brightest pixels in the blended gray image 203, the sum of the intensity of the green channel in each of the pixels in the initial image that correspond to the brightest pixels in the blended gray image 203, and the sum of the intensity of the blue channel in each of the pixels in the initial image that correspond to the brightest pixels in the blended gray image 203 may be separately calculated. Then each of the sums corresponding to each channel may each be divided by the number of pixels included in the small fraction of brightest pixels. In other words, the value of the atmospheric light may be calculated using:

$$\text{Atmospheric Light} = \sum_{i=1}^{\text{number of brightest pixels}} \frac{\vec{I}_{brightest\ pixels}(\vec{x})_i}{\text{number of } brigtest \text{ pixels}} \quad \text{Eq. 6}$$

The inventors of this application have identified that the brightest pixels in the blended gray image 205 may correspond to an object and not the sky region in the initial image 202, and may be too colorful, resulting in discoloration in the enhanced image 218. For example, the image could include a bright yellow car that could easily corrupt the atmospheric correction of the blended gray image if not properly excluded. Advantageously, blocks 408-412 describe steps to restrict the saturation of the atmospheric light to the gray range to ensure the value of the atmospheric light corresponds to an atmospheric light like color to protect against discoloration. In various embodiments, the steps described in blocks 408-412 may be optional.

As next illustrated in block 408, and described with reference to FIG. 2A, the saturation of the atmospheric light may be determined. The saturation of the atmospheric light may be determined by converting the atmospheric light to a hue, saturation, value (HSV) representation.

As next illustrated in block 410 and described with reference to FIG. 2A, the saturation of the atmospheric light may be restricted to the gray range. In various embodiments, the atmospheric light may be restricted to the gray range by restricting the saturation of the atmospheric light to a value less than or equal to 0.1.

As next illustrated in block 412 and described with reference to FIG. 2A, the value of the atmospheric light may be updated based on the restricted saturation. In other words, after restricting the saturation, the HSV representation may be converted back to RGB representation resulting in the value of the atmospheric light.

In various embodiments, as described above, for each of the pixels, a value for the mid-scene transmission map 216 may be generated. The value for the mid-scene transmission map 216 may be generated by combining and inverting, for each of the plurality of pixels, the value for the brightened transmission map 212 and the value of the adjusted brightened blended gray image 214.

Figure 6:
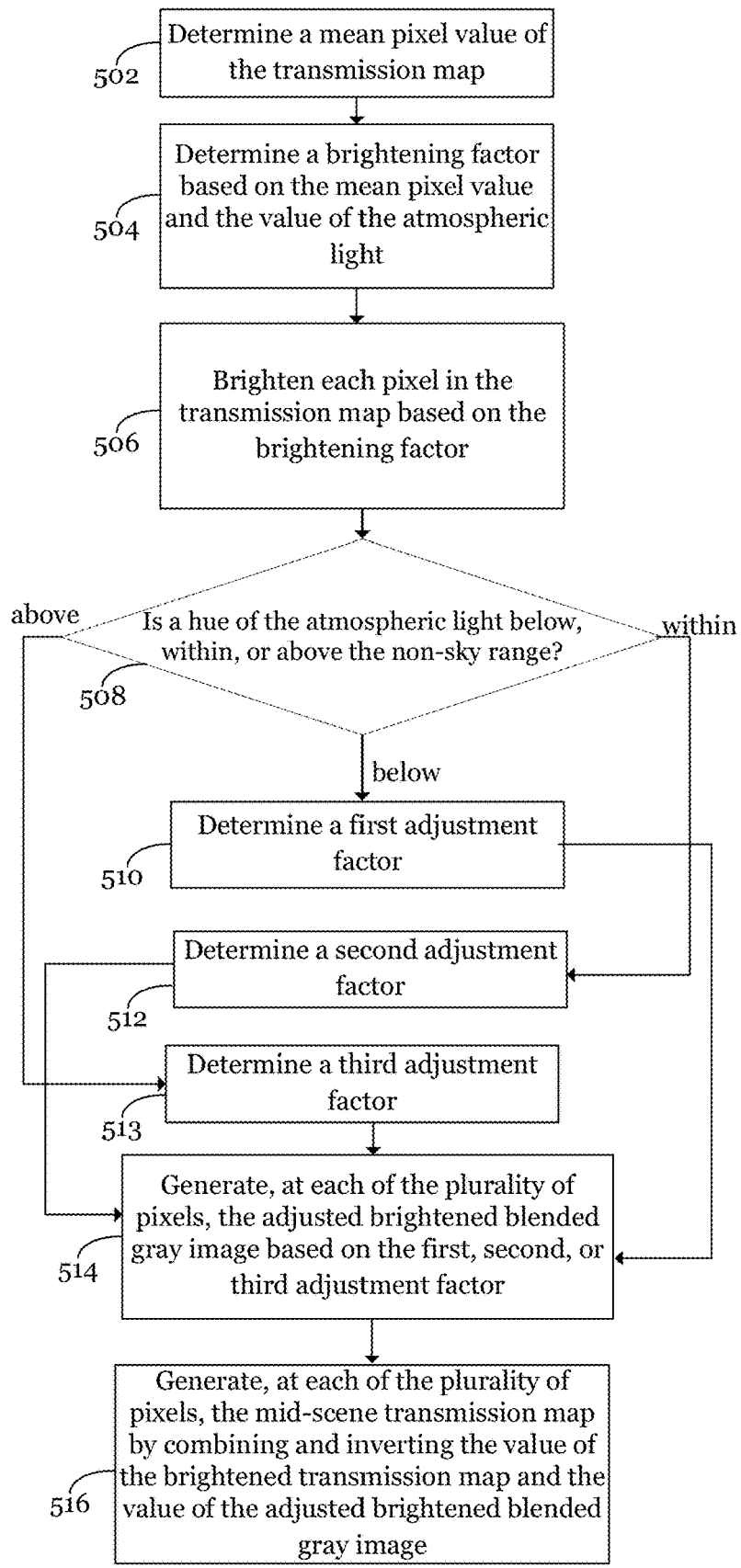
FIG. 6 illustrates a process flow for generating a mid-scene transmission map according to an embodiment of the present application.

FIG. 6 illustrates the process steps of generating, for each of the plurality of pixels, the value for the mid-scene transmission map 216. In particular, blocks 502-506 illustrate the steps of generating, for each of the plurality of pixels, the value for the brightened transmission map 212, blocks 508-514 illustrate the steps, for each of the plurality of pixels, generating the value for the adjusted brightened blended gray image 214, and block 516 illustrates the step of combining and then inverting, at each of the plurality of pixel, the value for the brightened transmission map 212 and the value for the adjusted brightened blended gray image 214 to generate the value of mid-scene transmission map 216.

As illustrated in block 502 and described with reference to FIG. 2A, for each of the plurality of pixels, a mean value of the transmission map 210 may be determined.

As next illustrated in block 504 and described with reference to FIG. 2A, a brightening factor may be determined based on the mean value of the transmission map 210 and the atmospheric light. This will be discussed in more detail in FIG. 8 below.

As next illustrated in block 506 and described with reference to FIG. 2A, for each of the plurality of pixels, a value for the brightened transmission map 212 may be generated based on the brightening factor. In various embodiments, the values for the brightened transmission map 212 may be generated by applying the following formula to each pixel in the transmission map 210:

$$\vec{f}(x) = \vec{t}(x)^b \quad \text{Eq.7}$$

Where $\vec{t}(x)$ represents the value for each the pixels for the transmission map 210, b represents the brightening factor, and $\vec{f}(x)$ represents the value for each of the pixels for the brightened transmission map 212.

The inventors of this application have observed, from the atmospheric light of images having small amounts of haze that the atmospheric light should be close to the possible value of the color of the sky in the initial image 202. In other words, images having atmospheric light with hues within the possible sky color ranges (i.e. above or below a possible non-sky range) of the initial image may require less dehazing. Therefore, in various embodiments, the adjusted brightened blended gray image 214 may be generated based on a first adjustment factor, a second adjustment factor, or a third adjustment depending on whether less or more dehazing is required, respectively.

As described above, blocks 508-516 illustrate the process steps of generating the adjusted brightened blended gray image 214.

As next illustrated in block 508, whether the hue of the calculated atmospheric light is above, below, or within a possible non-sky range of the initial image 202 may be determined. In other words, it may be determined whether the hue of the atmospheric light is below, within, or above, a range of hues that cannot represent the color of the sky in the initial image 202. (e.g., the non-sky range). In various embodiments, the hue of the atmospheric light may be within the non-sky range if it is between 0.5 and 0.7, alternatively, between 0.7 and 0.6. If the hue is not within of this range then it is within a first range of hue values below the non-sky range or a second range of hue values above the non-sky range that both represent possible hues of the sky in the initial image 202.

If the hue of the calculated atmospheric light is below the non-sky range the method proceeds to block 510 and a first adjustment factor is determined.

The inventors of the application have identified that a first adjustment factor having a value between 0.4 and 0.8 is ideal for images having an atmospheric light with a hue below the possible non-sky range.

Therefore, the first adjustment factor may be determined by mapping the value of hues that are below the possible non-sky range to values between 0.4 to 0.8. In other words, the adjustment factor may be determined using the equation:

$$adjust_1 = \frac{1000h + 74}{185} \quad \text{Eq. 8}$$

Where $adjust_1$ represents the first adjustment factor and h represents the hue of the atmospheric light in radians.

As next illustrated in block 516, and described with reference to FIG. 2A, after determining the first adjustment factor, for each of the plurality of pixels, the values for the adjusted brightened blended gray image 214 may be generated from the values of the brightened blend gray image 208 based on the first adjustment factor using the following equation:

$$\vec{g}(1-\vec{t}(x)) = adjust_1 * (1-\vec{t}(x)) \quad \text{Eq. 9}$$

Where $\vec{g}(1-\vec{t}(x))$ represents the value of each of the plurality of pixels for the adjusted brightened blended gray image 214.

On the other hand, referring back to block 508, if the hue of the calculated atmospheric light is in the non-sky range, the method proceeds to block 512 and a second adjustment factor may be determined.

The inventors of the application have identified that if the atmospheric light of the initial image 202 has a hue within the non-sky range (e.g. a hue outside of the possible sky range of the initial image 202) a greater quantity of haze may be present and a second adjustment factor having a range between 0.8 and 1 is ideal.

Therefore, in various embodiments, the second adjustment factor may be determined using the following equation:

$$\text{adjust}_2 = -3.16*h^2 + 2h + 0.6685 \quad \text{Eq. 10}$$

Where $\text{adjust}_2$ represents the second adjustment factor.

Then, referring back to block 516, after determining the second adjustment factor, for each of the plurality of pixels, values for the adjusted brightened blended gray image 214 may be generated from the values of the brightened blended gray image 208 based on the second adjustment factor using the following equation:

$$\vec{g}(1-\vec{t}(x)) = \text{adjust}_2 * (1-\vec{t}(x)) \quad \text{Eq. 11}$$

On the other hand, referring back to block 508 if the hue of the calculated atmospheric light is above the sky range, the method proceeds to block 513 and a third adjustment factor may be determined.

The inventors of this application have identified that if the atmospheric light in the initial image 202 has a hue above the non-sky range a lesser quantity of haze may be present and a third adjustment factor having a range between 0 and 0.8 is ideal. Therefore, in various embodiments, the third adjustment factor may be determined using the following equation:

$$\text{adjust}_3 = \frac{800h - 800}{-411} \quad \text{Eq. 12}$$

Where $\text{adjust}_3$ represents the third adjustment factor.

Then, referring back to block 516, after determining the third adjustment factor, for each of the plurality of pixels, the values for the adjusted brightened blended gray image 214 may be generated from the values of the brightened blended gray image 208 based on the third adjustment factor using the following equation:

$$\vec{g}(1-\vec{t}(x)) = \text{adjust}_3 * (1-\vec{t}(x)) \quad \text{Eq. 13}$$

Advantageously, when generating the value for the adjusted brightened blended gray image 214, the adjustment factor may be determined based on whether more or less dehazing needs to take place. As understood by those with ordinary skill in the art, the higher the values of pixels in the mid-scene transmission map 216 (e.g. the closer they are to one), the less those pixels will be dehazed (as demonstrated by Eq. 5). Further, based on Eq. 14, shown below, the lower the value of a pixel for the adjusted brightened blended gray image 214, the higher the value of the corresponding pixel for the mid-scene transmission map 216 will be. Therefore, the more the values of pixels are reduced for the adjusted brightened blended gray image 214, the less dehazing may take place (and vice versa).

Particularly, brightened blended gray images that are adjusted using the first and third adjustment factors may be darkened more than brightened blended gray images adjusted using the second adjustment factor. In some embodiments, the amount of darkening caused by the first adjustment factor may be greater than or equal to the amount of darkening caused by the third adjustment factor. In other words, if the hue of the calculated atmospheric light is within the possible sky range (i.e. above or below the non-sky range), pixel values will decrease more than if the hue is within the non-sky range when generating the values for the adjusted brightened blended gray image 214. Advantageously, this ensures that values of pixels in images having an atmospheric light with a hue within the possible sky range will be reduced more by the first adjustment factor or the third adjustment factor and undergo less dehazing than pixels in an image with an atmospheric light with within the non-sky range.

In other words, if the sky color of the initial image 202 is detected in the atmospheric light, the initial image 202 must have a small quantity of haze. Therefore, the first, second, and third adjustment factors ensure that images including larger quantities of haze undergo more dehazing (and vice versa).

As next illustrated in block 516 and described with reference to FIG. 2A, for each of the plurality of pixels, the values for adjusted brightened blended gray image 214 and the brightened transmission map 212 may be combined and inverted to generate the values for the mid-scene transmission map 216. The mid-scene transmission map 216 may be generated by:

$$\vec{T}(x) = 1 - \vec{f}(\vec{t}(x)) * g(1-\vec{t}(x)) \quad \text{Eq. 14}$$

Where $\vec{T}(x)$ represents the values of pixels for the mid-scene transmission map 216.

As understood by those with ordinary skill in the art, because the transmission map 210 may be generated by inverting the pixel values for the brightened blended gray image 208, pixels with values equal to zero in the transmission map 210 represent sky areas or very foggy distant objects, and dehazing them would capture noise in lieu of scene information. On the other hand, pixels with equal to one represent pixels in which there is no haze, so dehazing is not required. Advantageously, generating the values for the mid-scene transmission map 216 ensures that only pixels in the transmission map 210 with mid-range values (e.g. values between zero and one) undergo any dehazing. In other words, pixels with values of zero in the transmission map 210 may be pushed to one for the mid-scene transmission map 216, while pixels equal to one in the transmission map 210 remain equal to one. Therefore, the recovered scene radiance of pixels with values equal to zero or one in the transmission map 210 may have values equal to their corresponding pixels in the initial image 202. Thus, dehazing may be limited to pixels with values between zero and one for the transmission map 210 ensuring that pixels that should not be dehazed are not dehazed.

The amount of haze present in the initial image 202 varies as the value of the average atmospheric light and the mean value of the transmission map 210 are decreased. Advantageously, the brightening factor may account for the amount of dehazing to be added.

Figure 7:
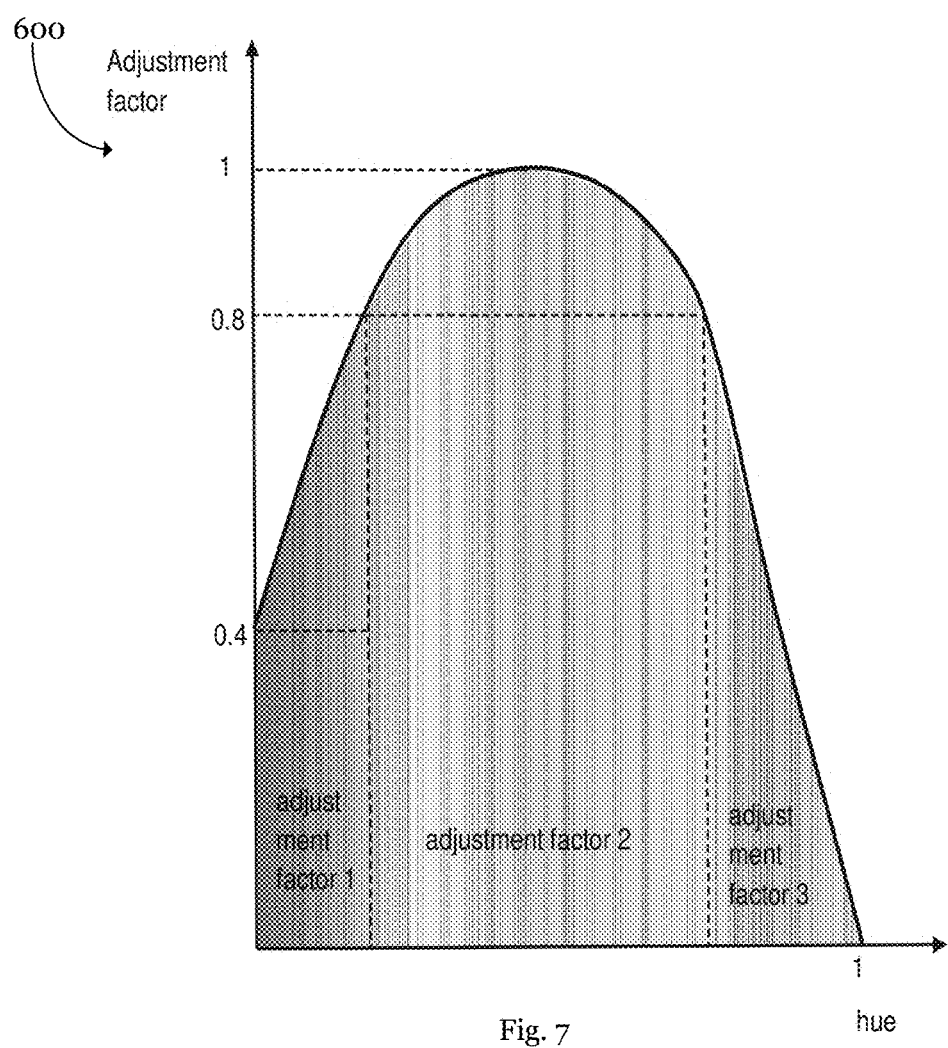
FIG. 7 illustrates a graphical representation illustrating how to determine a first, second, or third adjustment factor based on the hue of the atmospheric light.

FIG. 7 illustrates a graphical representation 600 illustrating how to determine a first, second, or third adjustment factor based on the hue of the atmospheric light.

Referring to FIG. 7, whether a first, second, or third adjustment factor is used to generate the adjusted brightened blended gray image 214 may be determined based whether the on the hue of the atmospheric light of the initial image 202. In other words the adjustment factor used to generate the adjusted blended brightened gray image 214 from the brightened blended gray image 208 may be determined based on whether the hue of the atmospheric light is within the sky-range of the initial image 202. As described above, whether the hue of the atmospheric light is within the sky range may be determined if the hue is above or below a non-sky range of the initial image. Particularly, the first adjustment factor may be used if the hue is below the non-sky color range, a second adjustment factor may be used if the hue is within a non-sky color range, and a third adjustment factor may be used if the hue is above the non-sky range. In various embodiments the non-sky color range may comprise hues between 0.5 and 0.7, alternatively between 0.7 and 0.6.

Figure 8:
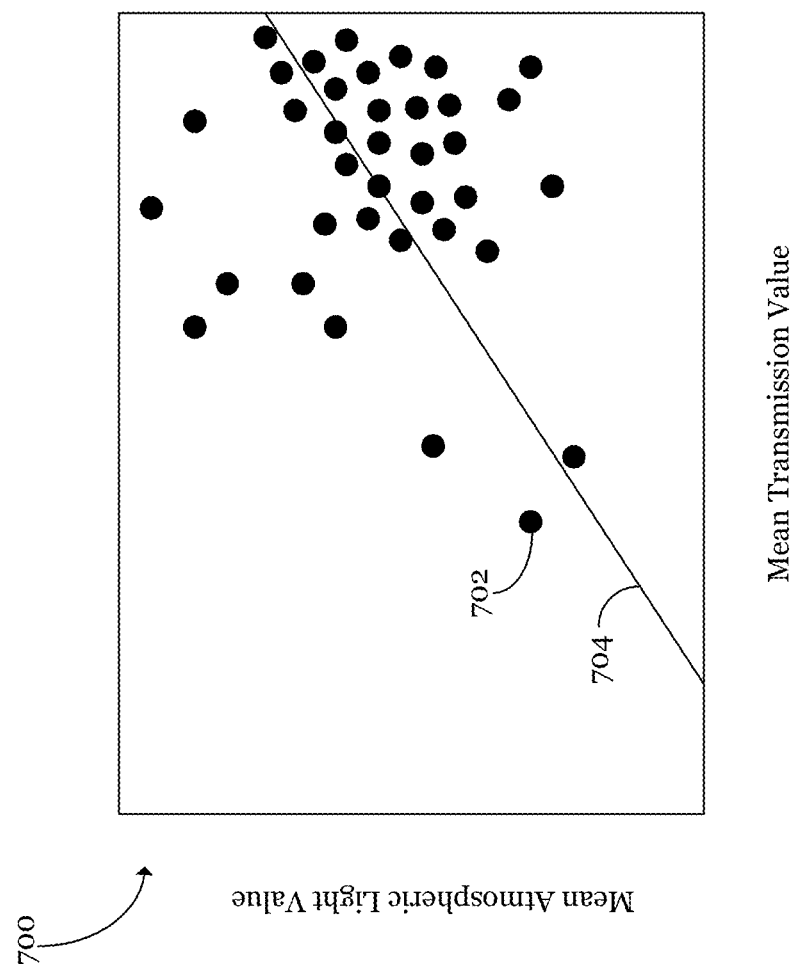
FIG. 8 illustrates a model used to determine a brightness factor according to an embodiment of the present application.

Referring to FIG. 8, an equation for a linear trend line 704 corresponding to a plurality of data points 702 may be used to calculate the brightening factor. Each data point 702 may represent an image. The data points 702 may be graphed based on the relationship between the value of their average atmospheric light and the mean pixel intensity value of their respective transmission maps. The formula corresponding to the linear trend line 704, may be used to determine the brightening factor. In other words, the brightening factor (e.g. the equation of the linear trend line) is determined as follows:

$$b = \left(\frac{0.25}{0.3}\right) * T_{mean} - 0.183 \qquad \text{Eq. 15}$$

Where $T_{mean}$ represents the mean pixel value of the transmission map 210 and b represents the brightening factor.

As understood by those with ordinary skill in the art, the smaller the mean pixel value of the transmission map 210 and the smaller the value of the average atmospheric light, the more dehazing is required (e.g. the hazier the image is). Advantageously, the brightness factor is determined based on this relationship and ensures that the smaller the mean pixel value of the transmission map 210 the more the image is dehazed.

Figure 9:
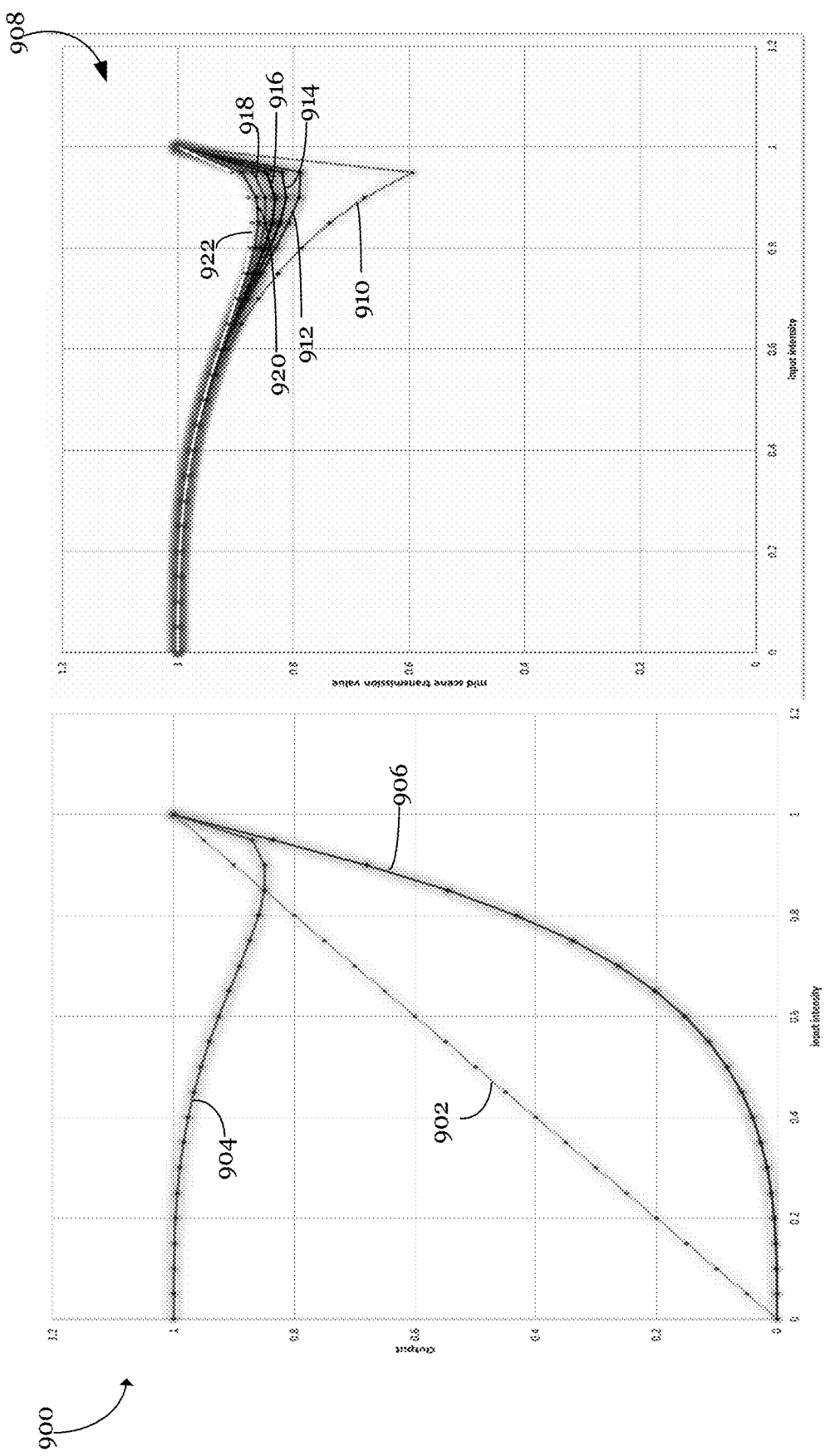
FIG. 9 illustrates a graphical representation of the pixel-by pixel method and how the brightening factor accounts for the amount of dehazing required.

FIG. 9 illustrates a graphical representation of the pixel-by pixel method and how the brightening factor accounts for the amount of dehazing required.

Referring to FIG. 9 a first graph 900 illustrates the output values of the pixel-by-pixel method of dehazing an image. In various embodiments, the input may represent the pixel values at the beginning of a step of the pixel-by-pixel method and the output may represent the pixel values generated at the conclusion of each step. In other words, first graph 900 illustrates how the pixel values change from the input image intensity 902 to the mid-scene transmission map intensity 904, and then from the mid-scene transmission map intensity 904 to the output image intensity 906. Advantageously as described above, the closer the value of a pixel is to mid-range (e.g. 0.5) in the input image the more it will be dehazed. In other words, the distance between the line labeled linear and the line labeled J increases as the line labeled linear approaches 0.5 (and vice versa).

Further a second graph 908 illustrates a graphical representation of the relationship between the brightening factor and the amount of dehazing.

Second graph 908 illustrates a first line 910 representing pixel values of a mid-scene transmission map with a mean pixel value of 0.1, a second line 912 representing the pixel values of the mid-scene transmission map generated using a brightening factor of 0.5, a third line 914 representing the pixel values of the mid-scene transmission map generated using a brightening factor of 0.6, a fourth line 916 representing the pixel values of the mid-scene transmission map generated using a brightening factor of 0.7, a fifth line 918 representing the pixel values of the mid-scene transmission map generated using a brightening factor of 0.8, a sixth line 920 representing the pixel values of the mid-scene transmission map generated using a brightening factor of 0.9, and a seventh line 922 representing the pixel values of the mid-scene transmission map generated using a brightening factor of 1.

Referring to second graph 902 as the brightening factor decreases the amount of dehazing increases (and vice versa). In other words, the equation for calculating the brightening factor (Eq. 15) ensures that the lower the mean pixel value for the transmission map 210, the lower the brightening factor (and vice versa). In other words, the hazier the image the lower the brightening factor.

Consequently, referring to Eq. 7, the lower the brightening factor, the brighter the brightened transmission map 212 will be (or vice versa). Also, as further evidenced by Eq. 14, the brighter the brightened transmission map 212, because the brightened transmission map 212 is inverted, the darker the mid-scene transmission map 216 will be (and vice versa). Furthermore, as described above, the darker the mid-scene transmission map 216 (e.g. lower the values of the plurality of pixels in the mid-scene transmission map 216), the more dehazing the will occur. Therefore, as illustrated in FIG. 9 the hazier the image, the lower the brightening factor, which results in a brighter transmission map 210, and because the transmission map is inverted when generating the mid-scene transmission map 216, this ensures that hazier images undergo more dehazing than less hazy images.

FIGS. 10A-10D illustrates a process flow of dehazing an example pixel according to an embodiment of the present application, where FIG. 10A illustrates capturing the initial image, FIG. 10B illustrates generating the value for atmospheric light of the initial image, FIG. 10C illustrates restricting the saturation of the atmospheric light, and FIG. 10D illustrates determining the value of the example pixel for the brightened initial image. Although a single pixel is described, the steps described below may be applied to each pixel of the initial image 202.

Referring to FIG. 10A, first, the initial image 202 may be captured and the value of the example pixel may be determined. For example purposes, the initial image 202 may be a red, green, blue image (RGB image). The example pixel in the initial image 1002 may have a red channel (R) intensity equal to 0.5, a green channel (G) equal to 0.4, and a blue channel (B) equal to 0.3.

Then, the value of the example pixel for the blended gray image 204 may be generated using:

$$R*G*B=0.5*0.4*0.3=0.6$$

Next, the value of the atmospheric light may be calculated. First, a small fraction brightest pixels in the blended gray image 205 may be determined. For example brightest pixels in the blended gray image 205 may be the pixels that are in the top 1% brightest pixels in the blended gray image 204. Next, the value of the atmospheric light may be calculated by determining the average intensity of each of the color channels across each of the pixels in the initial image 202 that correspond to the brightest pixels in the blended gray image 203 using Eq. 6 in the same manner described in FIG. 5. Referring to FIG. 10B, the value of an RGB representation 1004 of the atmospheric light may comprise an intensity of 0.8 corresponding to the red channel, an intensity of 0.8 corresponding to the green channel, and an intensity of 0.9 corresponding to the blue channel.

Next, referring to FIG. 10C, the saturation of the atmospheric light may be restricted to gray scale. First, the atmospheric light may be converted to Hue Saturation Value (HSV) representation 1006. Then an updated HSV representation 1008 may be generated by restricting the saturation to a value less than or equal to 0.1. As illustrated in FIG. 10C, for example purposes, the saturation value is restricted to 0.1. Then based on the updated saturation value, the updated HSV representation may be converted to an updated RGB representation 1010 resulting in the value of the atmospheric light.

Next, referring to FIG. 10D, the value of the example pixel for the brightened initial image 1012 may be generated by brightening the example pixel using Eq. 3 in the same manner described in FIG. 2A. As illustrated in FIG. 10D, a brightening constant of 0.45 may be used. For example, the intensity of the red channel of the value of the example pixel for the brightened initial image 1012 may be calculated using:

$$I_{brightenedimage(Red\ channel)}(x) = \left(\frac{0.5}{0.9}\right)^{0.45} = 0.8$$

Next, the value of the example pixel for the transmission map 210 may be generated by blending the color channels of example pixel of the brightened initial image 1012, and then inverting the result. In other words, the color channels of the brightened initial image 206 may be blended and inverted follows:

$$t(x)=1-(R_{brightened\ image}*G_{brightened\ image}*B_{brightened\ image})$$

$$1-(0.8*0.7*0.6)=0.66$$

Then, the value of the example pixel for the brightened transmission map 212 may be generated using Eq. 7 in the same manner described in FIG. 6. In other words, the mean pixel value of the transmission map and a brightening factor may be determined and used to brighten the pixel. In various embodiments, the brightening factor may be determined using Eq. 15 in the same manner described in FIG. 8. For example, a mean pixel value of the transmission map equal to 0.52 may be used. In other words the brightening factor may be determined as follows:

$$b = \frac{0.25}{0.3} * T_{mean} - 0.183$$

$$\frac{0.25}{0.3} * 0.52 - 0.183 = 0.25$$

Then, using the brightening factor, the value of the example pixel for the brightened transmission map 212 may be determined as follows:

$$f(x)=t(x)^b$$

$$0.66^{0.25}=0.90$$

Next, the value of the example pixel for the adjusted brightened blended gray image 214 may be generated by adjusting the value of the pixel in the brightened blended gray image 208 based on the hue of the atmospheric light. Because the hue is within the non-sky range, Eq. 10 may be used to determine the second adjustment factor in the same manner discussed in FIG. 6. Then the adjusted brightened blended gray image 214 may be generated by adjusting the intensity of the pixel in the brightened blended gray image 208 using Eq. 11 in the same manner described in FIG. 6.

In other words, the second adjustment factor may be determined as follows:

$$adjust_2=-3.16h^2+2h+0.6685$$

$$adjust_2=-3.16*0.5^2+2*0.5+0.6685=0.91$$

Then, using the second adjustment factor, the value of the example pixel for the adjusted brightened blended gray image may be determined as follows:

$$(1-t(x))=adjust_2*(1-t(x))$$

$$0.91*(1-0.66)=0.31$$

Next, the value of the example pixel of the mid-scene transmission map 216 may be generated by combining and inverting the value of the pixel in the brightened transmission map and the adjusted brightened blended gray image using Eq. 14 in the same manner described in FIG. 6, using:

$$T(x)=1-f(t(x))*g(1-t(x))$$

$$1-0.90*0.31=0.72$$

Last, the value of the scene radiance of the example pixel in the initial image may be recovered using Eq. 5 in the same manner described in FIG. 2A, resulting in a dehazed pixel. As illustrated in FIG. 10C, for example purposes, only the recovered scene radiance of the red channel is shown using:

$$J(x) = \frac{I(x) - A}{T(x)} + A$$

$$\frac{0.5 - 0.9}{0.72} + 0.9 = 0.34$$

This calculation may be repeated for the green and blue color channels of the example pixel.

Embodiments of the image processing have been applied to test samples. The test sample with regions of bright/dark regions are imaged and processed with the embodiments. In an example, a target pattern including concentric circles of different levels of brightness can be imaged and the image processing applied. Advantageously, embodiments when applied to such test samples produce sharp transitions between bright/dark regions and avoid introducing artificial artefacts. In contrast, when the preprocessing for haze removal is performed using a region based approach, transitions between bright/dark regions become diffuse. Advantageously, the use of a pixel-by-pixel dehazing operation discussed in embodiments of this disclosure avoids the introduction of such artefacts.

Embodiments of the present application embody a practical application of an image enhancing process, e.g., for improving an image by removing effects of fog or haze, and otherwise improve contrast, which can be implemented directly in a low power device such as an image sensor or a low power processor. Particularly, embodiments of the present application enable the use of low powered computational processors and sensors to perform the computations described above to enhance an image using pixel based operations. Advantageously this allows for a significant technological improvement in image sensing and processing because conventional algorithms are either computationally expensive and therefore power hungry or unable to achieve the same level of enhancement possible with the embodiments. Because of the low computational load of the various embodiments, the processing can be performed within the image capturing device while preprocessing the image.

Example embodiments of the present invention are summarized here. Other embodiments can also be understood from the entirety of the specification and the claims filed herein.

Example 1. A method for enhancing an image, the method including: capturing an initial image including a plurality of pixels; and performing a pixel-by-pixel dehazing operation for each of the plurality of pixels, the performing including generating, for each of the plurality of pixels, a value for a blended gray image based on color channels of the pixel, generating, for each of the plurality of pixels, a value for a transmission map based on the blended gray image, and generating, for each of the plurality of pixels, output color channels for a processed image based on the value for the transmission map, the processed image being an enhancement of the initial image.

Example 2. The method of example 1, where the capturing and the performing are performed at an image sensor chip.

Example 3. The method of one of examples 1 or 2, where generating the value for the blended gray image from color channels of the pixel includes, for each of the plurality of pixels, multiplying an intensity of the color channels the pixel by one another.

Example 4. The method of one of examples 1 to 3, where the pixel-by-pixel dehazing operation further includes: calculating, for each of the plurality of pixels, a value for an atmospheric light of the initial image from the blended gray image; generating, for each of the plurality of pixels, a value for a brightened initial image from the value for the atmospheric light; generating, for each of the plurality of pixels, a value for a brightened blended gray image from the value for the brightened initial image value; and generating, for each of the plurality of pixels, the value for the transmission map from the value for the brightened blended gray image, where the generating of the output color channels for the processed image includes generating, for each of the plurality of pixels, a value for an mid-scene transmission map from the value for the transmission map, and recovering, for each of the plurality of pixels, a scene radiance value of the initial image based on pixel values in the mid-scene transmission map, the initial image, and the atmospheric light.

Example 5. The method of one of examples 1 to 4, where calculating a value for an atmospheric light of the initial image from the blended gray image includes: determining, for each of the plurality of pixels, the brightest pixels in the blended gray image, where the brightest pixels in the blended gray image are pixels having values within a small fraction of values in the blended gray image; determining, at each of the brightest pixels in the blended gray image, an intensity of the color channels of pixels in the initial image that correspond to the brightest pixels in the blended gray image; and determining, an average intensity of each color channel at the pixels in the initial image that correspond to the brightest pixels in the blended gray image.

Example 6. The method of one of examples 1 to 5, where calculating the value for the atmospheric light of the initial image from the value for the blended gray image further includes: determining a saturation of the atmospheric light based on the value for the atmospheric light; restricting the saturation of the atmospheric light to the gray range, where restricting the saturation of the atmospheric light to gray scale includes restricting the saturation of the atmospheric light to a value less than or equal to 0.1; and updating the value for the atmospheric light based on the restricted saturation.

Example 7. The method of one of examples 1 to 6, where generating the value for the brightened initial image from the value for the atmospheric light includes: generating, for each of the plurality of pixels, an intensity of each of the color channels of the pixel for the brightened initial image, where generating the intensity of each of the color channels of the pixel for the brightened initial image includes: dividing, for each of the plurality of pixels, the intensity of each color channel of the pixel in the initial image by the intensity of a corresponding color channel of the atmospheric light; and applying, for each of the plurality of pixels, a brightening constant to the result of said division.

Example 8. The method of one of examples 1 to 7, where generating the value of the transmission map from the blended gray channel includes, inverting, for each of the plurality of pixels, the value of the brightened blended gray image.

Example 9. The method of one of examples 1 to 8, where generating the value for the brightened blended gray image includes: multiplying, for each of the plurality of pixels, an intensity of each of the color channels of each pixel in the brightened initial image by one another.

Example 10. The method of one of examples 1 to 9, where generating the value for the mid-scene transmission map from the value of the transmission map includes: generating, for each of the plurality of pixels, a value for a brightened transmission map from the value for the transmission map; generating, for each of the plurality of pixels, a value for an adjusted brightened blended gray image from the value of the brightened blended gray image based on a hue of the atmospheric light; combining, for each of the plurality of pixels, the value of the brightened transmission map and the value of the adjusted brightened blended gray image; and inverting, for each of the plurality of pixels, a combined value of the brightened transmission map and the adjusted brightened blended gray image.

Example 11. The method of one of examples 1 to 10, where generating the value for the brightened transmission map includes: determining, for each of the plurality of pixels, a mean value of the transmission map; determining, for each of the plurality of pixels, a brightening factor based on the mean value of the transmission map; and determining, for each of the plurality of pixels, the value for the brightened transmission map based on the brightening factor.

Example 12. The method of one of examples 1 to 11, where generating the value of the adjusted brightened blended gray image from the value of the brightened blended gray image based on a hue of the atmospheric light includes: determining whether a hue of the atmospheric light is within a possible sky range of the initial image, the possible sky range including hue values above or below a non-sky range; determining a first adjustment factor based on a determination that the hue of the atmospheric light is below the non-sky range; or determining a second adjustment factor based on a determination that the hue of the atmospheric light is within the non-sky range, the second adjustment factor being different from the first adjustment factor; or determining a third adjustment factor based on a determination that the hue of the atmospheric light is above the non-sky range, the third adjustment factor being different than the first and second adjustment factors; and determining, for each of the plurality of pixels, the value of the adjusted brightened blended gray image based on the first, the second, or the third adjustment factor.

Example 13. The method of one of examples 1 to 12, where recovering the scene radiance includes using the equation $$J(x) = \frac{I(x) - A}{T(x)} + A,$$

where I(x) represents, for each of the plurality of pixels, a value of the color channels of the pixels, A represents the atmospheric light, T(x) represents, for each of the plurality of pixels, the value for the mid-scene transmission map, and J(x) represents, for each of the plurality of pixels, the scene radiance value of the initial image.

Example 14. A method for enhancing an image, the method including: capturing an initial image including a plurality of pixels; generating a blended gray image from the initial image; generating a brightened blended gray image from a brightened initial image; generating, for each of the plurality of pixels, a transmission map; calculating an enhancement value based on determining how much haze is present in the initial image; adjusting the transmission map based on the enhancement value; determining whether a hue of atmospheric light in the initial image is within a possible sky color range of the initial image, the possible sky color range including hue values above or below a non-sky color range; adjusting the transmission map for each of the plurality of pixels using the enhancement value; adjusting the brightened blended gray image based on determining whether the hue of atmospheric light in the initial image is within the possible sky color range; and after adjusting the transmission map, generating an enhanced image from the adjusted transmission map, the adjusted brightened blended gray image, and the initial image.

Example 15. The method of example 14, where determining how much haze is present in the initial image is based on a mean value of the atmospheric light captured in the initial image and the mean value of the transmission map.

Example 16. The method of one of examples 14 or 15, where generating the blended gray image includes determining, for each of the plurality of pixels, a value for the blended gray image from color channels of each of the plurality of the pixels by multiplying an intensity of the color channels of each of the plurality of pixels by one another.

Example 17. The method of one of examples 14 to 16, where generating the brightened blended gray image includes: generating, for each of the plurality of pixels, a value for a brightened initial image based on atmospheric light captured in the initial image and a global brightening factor; and multiplying, for each of the plurality of pixels, an intensity of each of the color channels of each pixel in the brightened initial image by one another.

Example 18. The method of one of examples 14 to 17, where generating the transmission map includes: inverting, for each of the plurality of pixels, a value for the brightened blended gray image.

Example 19. The method of one of examples 14 to 18, where adjusting the brightened blended gray image further includes: determining a first adjustment factor based on a determination that the hue of the atmospheric light below the non-sky range color range; or determining a second adjustment factor based on a determination that the hue of the atmospheric light is within the non-sky range, the second adjustment factor being different from the first adjustment factor; or determining a third adjustment factor based on a determination that the hue of the atmospheric light is above the non-sky range, the third adjustment factor being different than the first and second adjustment factors; and adjusting, for each of the plurality of pixels, the value of the brightened blended gray image based on the first, the second, or the third adjustment factor.

Example 20. The method of one of examples 14 to 19, generating an enhanced image from the adjusted transmission map, the adjusted brightened blended gray image and the initial image includes: combining, for each of the plurality of pixels, the adjusted value of the transmission map and the adjusted value of the brightened blended gray image by multiplying, for each of the plurality of pixels, the adjusted value of the transmission map and the adjusted value of the brightened blended gray image; determining, for each of the plurality of pixels, an inverted value by inverting, for each of the plurality of pixels, the combined value of the adjusted transmission map and the adjusted brightened blended gray image; and recovering a scene radiance, for each of the plurality of pixels, based on the inverted value, an intensity of each color channel of the pixel in the initial image, and an intensity of each color channel of the atmospheric light captured in the initial image.

Example 21. An image enhancement device, the image enhancement device including: an image sensor configured to capture an initial image; a memory configured to store the captured the initial image; a display; and a processor in communication with the memory and the display, the processor being configured to execute instructions stored in the memory, the memory including instructions for: capturing an initial image including a plurality of pixels; and performing a pixel-by-pixel dehazing operation for each of the plurality of pixels, the performing including generating, for each of the plurality of pixels, a value for a blended gray image from color channels of the pixel, generating, for each of the plurality of pixels, a value for a transmission map from the blended gray image, and generating, for each of the plurality of pixels, output color channels for a processed image based on the value for the transmission map, the processed image being an enhancement of the initial image.

Example 22. The device of example 21, where the instructions for generating the value for the blended gray image from color channels of the pixel include instructions for, for each of the plurality of pixels, multiplying an intensity of the color channels the pixel by one another.

Example 23. The device of one of examples 21 or 22, where the instructions for the pixel-by-pixel dehazing operation further include instructions for: calculating, for each of the plurality of pixels, a value for an atmospheric light of the initial image from the blended gray image; generating, for each of the plurality of pixels, a value for a brightened initial image from the value for the atmospheric light; generating, for each of the plurality of pixels, a value for a brightened blended gray image from the value for the brightened initial image value; and generating, for each of the plurality of pixels, the value for the transmission map from the value for the brightened blended gray image, where the generating of the output color channels for the processed image includes generating, for each of the plurality of pixels, a value for an mid-scene transmission map from the value for the transmission map, and recovering, for each of the plurality of pixels, a scene radiance value of the initial image based on pixel values in the mid-scene transmission map, the initial image, and the atmospheric light.

Example 24. The device of one of examples 21 to 23, where the instructions for calculating a value for an atmospheric light of the initial image from the blended gray image include instructions for: determining, for each of the plurality of pixels, the brightest pixels in the blended gray image, where the brightest pixels in the blended gray image are a small fraction of the brightest pixels in the blended gray image; determining, at each of the brightest pixels in the blended gray image, an intensity of the color channels of pixels in the initial image that correspond to the brightest pixels in the blended gray image; and determining, an average intensity of each color channel at the pixels in the initial image that correspond to the brightest pixels in the blended gray image.

Example 25. The device of one of examples 21 to 24, where the instructions for calculating the value for the atmospheric light of the initial image from the value for the blended gray image further include instructions for: calculating the value for the atmospheric light of the initial image from the value for the blended gray image further includes: determining a saturation of the atmospheric light based on the value for the atmospheric light; restricting the saturation of the atmospheric light to the gray range, where restricting the saturation of the atmospheric light to gray scale includes restricting the saturation of the atmospheric light to a value less than or equal to 0.1; and updating the value for the atmospheric light based on the restricted saturation.

Example 26. The device of one of examples 21 to 25, where the instructions for generating the value of the transmission map from the blended gray channel includes instructions for inverting, for each of the plurality of pixels, the value of the brightened blended gray image.

Example 27. The device of one of examples 21 to 26, where the instructions for generating the value for the brightened blended gray image include instructions for: multiplying, for each of the plurality of pixels, an intensity of each of the color channels of each pixel in the brightened initial image by one another.

Example 28. The device of one of examples 21 to 27, where the instructions for generating the value for the mid-scene transmission map from the value of the transmission map include instructions for: generating, for each of the plurality of pixels, a value for a brightened transmission map from the value for the transmission map; generating, for each of the plurality of pixels, a value for an adjusted brightened blended gray image from the value of the brightened blended gray image based on a hue of the atmospheric light; and combining and inverting, for each of the plurality of pixels, the value of the brightened transmission map and the value of the adjusted brightened blended gray image.

Example 29. The device of one of examples 21 to 28, where the instructions for generating the value for the brightened transmission map include instructions for: determining, for each of the plurality of pixels, a mean value of the transmission map; determining, for each of the plurality of pixels, a brightening factor based on the mean value of the transmission map; and determining, for each of the plurality of pixels, the value for the brightened transmission map based on the brightening factor.

Example 30. The device of one of examples 21 to 29, where the instructions for generating the value of the adjusted brightened blended gray image from the value of the brightened blended gray image based on a hue of the atmospheric light include instructions for: determining a first adjustment factor based on a determination that the hue of the atmospheric light below the non-sky range color range; or determining a second adjustment factor based on a determination that the hue of the atmospheric light is within the non-sky color range, the second adjustment factor being different from the first adjustment factor; or determining a third adjustment factor based on a determination that the hue of the atmospheric light is above the non-sky color range, the third adjustment factor being different than the first and second adjustment factors; and adjusting, for each of the plurality of pixels, the value of the brightened blended gray image based on the first, the second, or the third adjustment factor.

Example 31. A method for enhancing an image includes generating a blended gray image from an initial image captured at an image sensor, the initial image comprising a plurality of pixels, the initial image comprising a first region comprising an object to be viewed and a second region comprising haze to be removed from the initial image, the blended gray image being generated by multiplying values of color channels of each of the plurality of pixels; and based on the blended gray image, removing the haze from the second region by performing a pixel-by-pixel operation.

Example 32. The method of example 31, further comprising calculating an average value of atmospheric light captured in the initial image based on a fraction of the brightest pixels in the blended gray image.

Example 33. The method of one of examples 31 to 32, further comprising determining an amount of haze present in the second region of the initial image, based at least in part on, an average value of atmospheric light captured in the initial image, wherein the average value of the atmospheric light captured in the initial image is determined based a fraction of the brightest pixels in the blended gray image.

Example 34. The method of one of examples 31 to 33, further comprising determining an average value of atmospheric light captured in the initial image based on the blended gray image and restricting a saturation of the average value of the atmospheric light in the initial image to a value less than or equal to 0.01.

Example 35. The method of one of examples 31 to 34, wherein removing the haze from the second region of the initial image by performing a pixel-by-pixel operation further comprises limiting dehazing to each of the plurality of pixels of a transmission map that have mid-range transmission values, wherein the transmission map is generated based on the blended gray image.

Example 36. The method of one of examples 31 to 35, wherein removing the haze from the second region of the initial image by performing a pixel-by-pixel operation further comprises limiting dehazing based on a hue of an average of atmospheric light captured in the initial image.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for enhancing an image, the method comprising:
   capturing an initial image comprising a plurality of pixels; and
   performing a pixel-by-pixel dehazing operation for each of the plurality of pixels, the performing comprising generating, for each of the plurality of pixels, a value for a blended gray image based on color channels of the pixel, generating, for each of the plurality of pixels, a value for a transmission map based on the blended gray image, and generating, for each of the plurality of pixels, output color channels for a processed image based on the value for the transmission map, the processed image being an enhancement of the initial image, wherein generating the value for the blended gray image from color channels of the pixel comprises, for each of the plurality of pixels, multiplying an intensity of the color channels of the pixel by one another.

2. The method of claim 1, wherein the capturing and the performing are performed at an image sensor chip.

3. The method of claim 1, wherein the pixel-by-pixel dehazing operation further comprises:

calculating, for each of the plurality of pixels, a value for an atmospheric light of the initial image from the blended gray image;

generating, for each of the plurality of pixels, a value for a brightened initial image from the value for the atmospheric light;

generating, for each of the plurality of pixels, a value for a brightened blended gray image from the value for the brightened initial image; and generating, for each of the plurality of pixels, the value for the transmission map from the value for the brightened blended gray image, wherein the generating of the output color channels for the processed image comprises:

generating, for each of the plurality of pixels, a value for an mid-scene transmission map from the value for the transmission map; and recovering, for each of the plurality of pixels, a scene radiance value of the initial image based on pixel values in the mid-scene transmission map, the initial image, and the atmospheric light.

4. The method of claim 3, wherein calculating a value for an atmospheric light of the initial image from the blended gray image comprises:

determining, for each of the plurality of pixels, the brightest pixels in the blended gray image, wherein the brightest pixels in the blended gray image are pixels having values within a small fraction-of values in the blended gray image;

determining, at each of the brightest pixels in the blended gray image, an intensity of the color channels of pixels in the initial image that correspond to the brightest pixels in the blended gray image; and determining, an average intensity of each color channel at the pixels in the initial image that correspond to the brightest pixels in the blended gray image.

5. The method of claim 4, wherein calculating the value for the atmospheric light of the initial image from the value for the blended gray image further comprises:

determining a saturation of the atmospheric light based on the value for the atmospheric light;

restricting the saturation of the atmospheric light to a gray range, wherein restricting the saturation of the atmospheric light to gray scale comprises restricting the saturation of the atmospheric light to a value less than or equal to 0.1; and updating the value for the atmospheric light based on the restricted saturation.

6. The method of claim 3, wherein generating the value for the brightened initial image from the value for the atmospheric light comprises:

generating, for each of the plurality of pixels, an intensity of each of the color channels of the pixel for the brightened initial image, wherein generating the intensity of each of the color channels of the pixel for the brightened initial image comprises:

dividing, for each of the plurality of pixels, the intensity of each color channel of the pixel in the initial image by the intensity of a corresponding color channel of the atmospheric light; and applying, for each of the plurality of pixels, a brightening constant to a result of said division.

7. The method of claim 3, wherein generating the value for the brightened blended gray image comprises:

multiplying, for each of the plurality of pixels, an intensity of each of the color channels of each pixel in the brightened initial image by one another, and wherein generating the value for the mid-scene transmission map from the value of the transmission map comprises:

generating, for each of the plurality of pixels, a value for a brightened transmission map from the value for the transmission map;

generating, for each of the plurality of pixels, a value for an adjusted brightened blended gray image from the value of the brightened blended gray image based on a hue of the atmospheric light;

combining, for each of the plurality of pixels, the value of the brightened transmission map and the value of the adjusted brightened blended gray image; and inverting, for each of the plurality of pixels, a combined value of the brightened transmission map and the adjusted brightened blended gray image.

8. The method of claim 7, wherein generating the value for the brightened transmission map comprises:

determining, for each of the plurality of pixels, a mean value of the transmission map;

determining, for each of the plurality of pixels, a brightening factor based on the mean value of the transmission map; and determining, for each of the plurality of pixels, the value for the brightened transmission map based on the brightening factor.

9. The method of claim 7, wherein generating the value of the adjusted brightened blended gray image from the value of the brightened blended gray image based on a hue of the atmospheric light comprises:

determining whether a hue of the atmospheric light is within a possible sky range of the initial image, the possible sky range comprising hue values above or below a non-sky range;

determining a first adjustment factor based on a determination that the hue of the atmospheric light is below the non-sky range; or determining a second adjustment factor based on a determination that the hue of the atmospheric light is within the non-sky range, the second adjustment factor being different from the first adjustment factor; or determining a third adjustment factor based on a determination that the hue of the atmospheric light is above the non-sky range, the third adjustment factor being different than the first and second adjustment factors; and determining, for each of the plurality of pixels, the value of the adjusted brightened blended gray image based on the first, the second, or the third adjustment factor.

10. The method of claim 3, wherein recovering the scene radiance value comprises using the equation $\vec{J}(\vec{x}) = \vec{I}(\vec{x}) - A/\vec{T}(x) + A$, wherein $\vec{I}(\vec{x})$ represents, for each of the plurality of pixels, a value of the color channels of the pixels, A represents a value for atmospheric light in the initial image, $\vec{T}(x)$ represents, for each of the plurality of pixels, the value for the mid-scene transmission map, and $\vec{J}(\vec{x})$ represents, for each of the plurality of pixels, the scene radiance value of the initial image.

11. A method for enhancing an image, the method comprising:
   generating a blended gray image from an initial image captured at an image sensor, the initial image comprising a plurality of pixels, the initial image comprising a first region comprising an object to be viewed and a second region comprising haze to be removed from the initial image, the blended gray image being generated by multiplying values of color channels of each of the plurality of pixels together; and
   based on the blended gray image, removing the haze from the second region by performing a pixel-by-pixel operation.

12. The method of claim 11, further comprising calculating an average value of atmospheric light captured in the initial image based on a fraction of the brightest pixels in the blended gray image.

13. The method of claim 11, further comprising determining an amount of haze present in the second region of the initial image, based at least in part on, an average value of atmospheric light captured in the initial image, wherein the average value of the atmospheric light captured in the initial image is determined based a fraction of the brightest pixels in the blended gray image.

14. The method of claim 11, further comprising determining an average value of atmospheric light captured in the initial image based on the blended gray image and restricting a saturation of the average value of the atmospheric light in the initial image to a value less than or equal to 0.01.

15. The method of claim 11, wherein removing the haze from the second region of the initial image by performing a pixel-by-pixel operation further comprises limiting dehazing to each of the plurality of pixels of a transmission map that have mid-range transmission values, wherein the transmission map is generated based on the blended gray image.

16. The method of claim 11, wherein removing the haze from the second region of the initial image by performing a pixel-by-pixel operation further comprises limiting dehazing based on a hue of an average of atmospheric light captured in the initial image.

17. An image enhancement device comprising:
   an image sensor configured to capture an initial image;
   a memory configured to store the captured the initial image; and
   a processor in communication with the memory, the processor being configured to execute instructions stored in the memory, the memory comprising instructions for:
   capturing an initial image comprising a plurality of pixels; and
   performing a pixel-by-pixel dehazing operation for each of the plurality of pixels, the performing comprising
      generating, for each of the plurality of pixels, a value for a blended gray image from color channels of the pixel,
      generating, for each of the plurality of pixels, a value for a transmission map from the blended gray image, and
      generating, for each of the plurality of pixels, output color channels for a processed image based on the value for the transmission map, the processed image being an enhancement of the initial image, wherein the instructions for generating the value for the blended gray image from color channels of the pixel comprise instructions for, for each of the plurality of pixels, multiplying an intensity of the color channels of the pixel by one another.

18. The device of claim 17, wherein the instructions for the pixel-by-pixel dehazing operation further comprise instructions for:
   calculating, for each of the plurality of pixels, a value for an atmospheric light of the initial image from the blended gray image;
   generating, for each of the plurality of pixels, a value for a brightened initial image from the value for the atmospheric light;
   generating, for each of the plurality of pixels, a value for a brightened blended gray image from the value for the brightened initial image; and
   generating, for each of the plurality of pixels, the value for the transmission map from the value for the brightened blended gray image,
   wherein the generating of the output color channels for the processed image comprises
      generating, for each of the plurality of pixels, a value for an mid-scene transmission map from the value for the transmission map, and
      recovering, for each of the plurality of pixels, a scene radiance value of the initial image based on pixel values in the mid-scene transmission map, the initial image, and the atmospheric light.

* * * * *